United States Patent
Colin

(10) Patent No.: US 11,212,437 B2
(45) Date of Patent: Dec. 28, 2021

(54) IMMERSIVE CAPTURE AND REVIEW

(71) Applicant: Bryan Colin, Short Hills, NJ (US)

(72) Inventor: Bryan Colin, Short Hills, NJ (US)

( * ) Notice: Subject to any disclaimer, the term of this patent is extended or adjusted under 35 U.S.C. 154(b) by 0 days.

(21) Appl. No.: 15/613,704

(22) Filed: Jun. 5, 2017

(65) Prior Publication Data

US 2017/0353658 A1 Dec. 7, 2017

Related U.S. Application Data

(60) Provisional application No. 62/346,234, filed on Jun. 6, 2016.

(51) Int. Cl.
| | |
|---|---|
| *H04N 5/232* | (2006.01) |
| *H04N 5/341* | (2011.01) |
| *H04N 5/217* | (2011.01) |
| *H04N 5/247* | (2006.01) |
| *H04N 5/77* | (2006.01) |
| *H04N 5/225* | (2006.01) |

(52) U.S. Cl.
CPC ......... *H04N 5/23238* (2013.01); *H04N 5/217* (2013.01); *H04N 5/2251* (2013.01); *H04N 5/2328* (2013.01); *H04N 5/23277* (2013.01); *H04N 5/247* (2013.01); *H04N 5/3415* (2013.01); *H04N 5/77* (2013.01)

(58) Field of Classification Search
CPC ............ H04N 5/23238; H04N 5/3415; H04N 21/6587; H04N 5/77; H04N 5/247; H04N 5/2328; H04N 5/2251; H04N 5/23277; H04N 5/217; G03B 37/00; G03B 37/04
See application file for complete search history.

(56) References Cited

U.S. PATENT DOCUMENTS

| | | | |
|---|---|---|---|
| 7,949,616 B2* | 5/2011 | Levy | G06Q 30/04 706/11 |
| 8,281,256 B2 | 10/2012 | Nelson et al. | |
| 8,694,553 B2 | 4/2014 | Shuster et al. | |
| 8,705,892 B2 | 4/2014 | Aguilera et al. | |
| 8,831,780 B2* | 9/2014 | Zelivinski | H04N 21/214 700/257 |

(Continued)

FOREIGN PATENT DOCUMENTS

EP 1 487 205 B1 12/2007

OTHER PUBLICATIONS

360HEROS ABC's—http://www.360heros.com/360heros-abcs-2/.
Vieweet Virtual Reality (VR)—https://www.vieweet.com/.

*Primary Examiner* — James R Sheleheda
(74) *Attorney, Agent, or Firm* — BakerHostetler

(57) ABSTRACT

In an embodiment, a system includes an immersive camera module including a camera mounting block having a plurality of camera mounting sites and a plurality of cameras mounted to the plurality of camera mounting sites. Each of the plurality of cameras includes a partially-overlapping field of view, and the camera module is configured to comprehensively capture a target space. The system further includes a chassis operatively coupled with the immersive camera module, the chassis configured to smoothly maneuver the camera module comprehensively through the target space. Aspects herein can also relate to methods for capturing immersions, systems and methods for providing immersions, and systems and methods for viewing and controlling immersions.

17 Claims, 30 Drawing Sheets

(56) References Cited

U.S. PATENT DOCUMENTS

| | | | |
|---|---|---|---|
| 8,909,391 B1 | 12/2014 | Peeters et al. | |
| 8,958,911 B2 * | 2/2015 | Wong | B25J 9/1694 |
| | | | 700/258 |
| 9,479,732 B1 * | 10/2016 | Saleh | H04N 5/3572 |
| 9,498,886 B2 * | 11/2016 | Rosenstein | B25J 5/007 |
| 9,536,351 B1 * | 1/2017 | Cote | G06F 3/011 |
| 9,654,734 B1 * | 5/2017 | High | H04N 13/378 |
| 9,761,045 B1 * | 9/2017 | Cote | G06T 15/30 |
| 9,776,327 B2 * | 10/2017 | Pinter | G06Q 50/22 |
| 9,785,149 B2 * | 10/2017 | Wang | G16H 40/67 |
| 9,902,069 B2 * | 2/2018 | Farlow | G05D 1/0246 |
| 10,304,247 B2 * | 5/2019 | King | H04N 7/157 |
| 2004/0117067 A1 * | 6/2004 | Jouppi | G06F 3/011 |
| | | | 700/259 |
| 2004/0170300 A1 * | 9/2004 | Jouppi | H04N 7/147 |
| | | | 382/103 |
| 2009/0110239 A1 * | 4/2009 | Chen | G06T 15/205 |
| | | | 382/103 |
| 2009/0165140 A1 * | 6/2009 | Robinson | G06Q 30/02 |
| | | | 726/26 |
| 2010/0110204 A1 * | 5/2010 | Campbell | G02B 27/646 |
| | | | 348/208.7 |
| 2010/0157064 A1 * | 6/2010 | Cheng | H04N 5/247 |
| | | | 348/169 |
| 2010/0231687 A1 | 9/2010 | Amory et al. | |
| 2011/0054717 A1 * | 3/2011 | Yamauchi | G05D 1/0038 |
| | | | 701/2 |
| 2012/0001938 A1 * | 1/2012 | Sandberg | H04L 67/38 |
| | | | 345/633 |
| 2012/0075414 A1 * | 3/2012 | Park | H04N 7/18 |
| | | | 348/36 |
| 2012/0249586 A1 * | 10/2012 | Wither | H04N 1/00323 |
| | | | 345/633 |
| 2013/0066623 A1 * | 3/2013 | Chou | H04L 67/2823 |
| | | | 704/2 |
| 2013/0148861 A1 * | 6/2013 | Ferlatte | G06K 9/00724 |
| | | | 382/107 |
| 2013/0176451 A1 | 7/2013 | Minetto | |
| 2014/0037281 A1 * | 2/2014 | Carney | G03B 17/561 |
| | | | 396/421 |
| 2014/0089281 A1 * | 3/2014 | Gorstan | G06F 16/50 |
| | | | 707/705 |
| 2014/0185013 A1 * | 7/2014 | Brown | F16M 11/123 |
| | | | 352/243 |
| 2014/0192144 A1 | 7/2014 | St. Clair | |
| 2014/0316614 A1 | 10/2014 | Newman | |
| 2015/0145887 A1 * | 5/2015 | Forutanpour | G02B 27/017 |
| | | | 345/633 |
| 2015/0278604 A1 * | 10/2015 | Shuster | H04L 67/22 |
| | | | 345/8 |
| 2015/0348580 A1 | 12/2015 | van Hoff et al. | |
| 2016/0165215 A1 * | 6/2016 | Gu | H04N 13/243 |
| | | | 348/43 |
| 2017/0023944 A1 * | 1/2017 | Wang | G06T 11/00 |
| 2017/0251181 A1 * | 8/2017 | Smolyanskiy | G05D 1/005 |
| 2017/0277180 A1 * | 9/2017 | Baer | G01S 17/933 |
| 2017/0353658 A1 * | 12/2017 | Colin | H04N 5/2328 |
| 2018/0181117 A1 * | 6/2018 | Rosenberg | G05D 1/0038 |
| 2021/0089040 A1 * | 3/2021 | Ebrahimi Afrouzi | |
| | | | A47L 9/2894 |

* cited by examiner

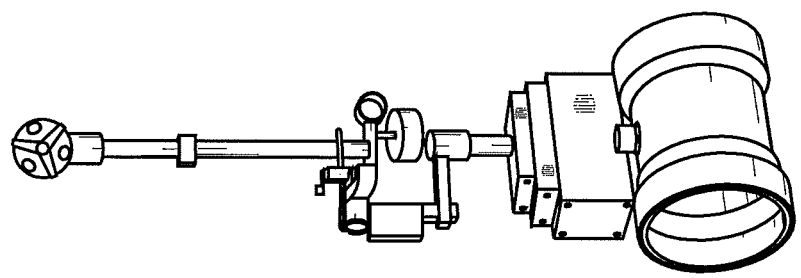
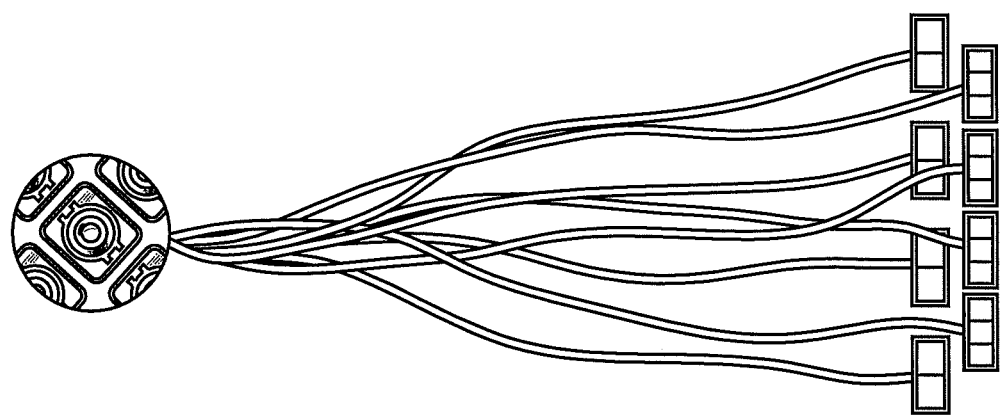
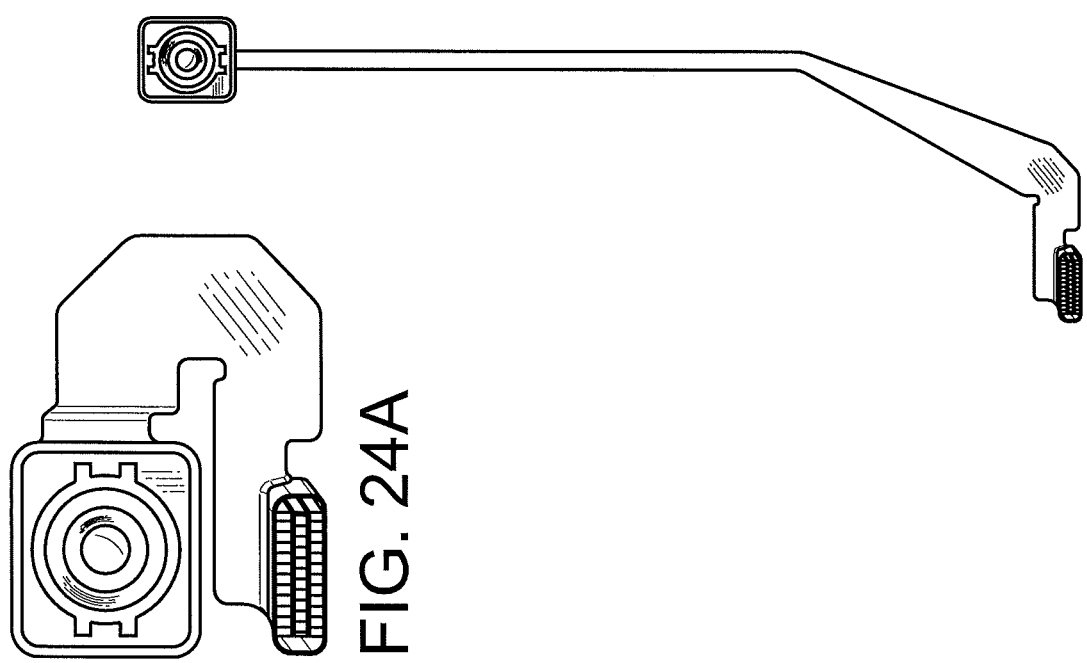

IMMERSIVE CAPTURE AND REVIEW

CROSS-REFERENCE TO RELATED APPLICATIONS

This patent application claims priority to and the benefit of provisional patent application 62/346,234 filed Jun. 6, 2016, which is incorporated herein by reference in its entirety.

TECHNICAL FIELD

The subject innovation generally relates to capturing and providing immersive media experiences. The subject innovation more specifically concerns allowing users to view remote locations in a non-linear and self-driven manner

BACKGROUND

Video and other media are used to allow entities to view or otherwise experience remote environments. However, this media has generally been limiting in a variety of ways. Moving video images are generally constrained to a linear path as recorded and do not permit substantial user interaction to drive the content. Still frame photographs can be used to provide additional control (e.g., with directional controls to move to an adjacent location) but are also limited to the views taken by the photographer. Current efforts to create immersive experiences including real-world (rather than computer-simulated) imaging also lack the degrees of freedom available to in-person visitors or participants. Consumers and viewers in many segments, including real estate/rentals, tourism, exploration, et cetera, can benefit from a more realistic experience with real-world degrees of freedom, and persons unable to participate in or attend various locations can be aided to do so with the development of more realistic experiences with real-world degrees of freedom.

SUMMARY

In an embodiment, a system includes an immersive camera module including a camera mounting block having a plurality of camera mounting sites and a plurality of cameras mounted to the plurality of camera mounting sites. Each of the plurality of cameras includes a partially-overlapping field of view, and the camera module is configured to comprehensively capture a target space. The system further includes a chassis operatively coupled with the immersive camera module, the chassis configured to smoothly maneuver the camera module comprehensively through the target space.

In an embodiment, a system includes an immersive video generation module configured to seamlessly combine a comprehensive capture of a target space to a travelable comprehensive immersion. The immersive video generation module is configured to receive at least one image from each of a plurality of cameras at a first location, continuously stitch the at least one image from each of the plurality of cameras at the first location to produce a first location immersion, receive at least one image from the plurality of cameras at a second location, continuously stitch the at least one image from each of the plurality of cameras at the second location to produce a second location immersion, and continuously stitch the first location immersion and the second location immersion to create a travelable comprehensive immersion.

In an embodiment, a method includes providing an immersive camera module including a camera mounting block having a plurality of camera mounting sites and a plurality of cameras mounted to the plurality of camera mounting sites. The each of the plurality of cameras includes a partially-overlapping field of view and the camera module is configured to comprehensively capture a target space. The method also includes providing a chassis operatively coupled with the camera module, the chassis configured to smoothly maneuver the camera module comprehensively through the target space and recording at least one image from each of the plurality of cameras to record a comprehensive capture of the target space. The method also includes simultaneously while recording, smoothly maneuvering the camera module through the target space.

In an embodiment, a method includes receiving at least one image from each of a plurality of cameras at a first location, continuously stitching the at least one image from each of the plurality of cameras at the first location to produce a first location immersion, receiving at least one image from the plurality of cameras at a second location, continuously stitching the at least one image from each of the plurality of cameras at the second location to produce a second location immersion, and continuously stitching the first location immersion and the second location immersion to create a travelable comprehensive immersion.

In an embodiment, a system includes an immersion engine configured to access a travelable comprehensive immersion. The immersion engine controls maneuver and view through the travelable comprehensive immersion based on user input. The system also includes a display configured to display the travelable comprehensive immersion as provided by the immersion engine and a control configured to provide the user input to the immersion engine.

In an embodiment, a method includes receiving a travelable comprehensive immersion, displaying an initial viewer state of the travelable comprehensive immersion, receiving user input related to the travelable comprehensive immersion, and displaying a subsequent viewer state of the travelable comprehensive immersion based on the user input. The subsequent viewer state differs from the initial viewer state in at least one of viewer position or viewer orientation.

These and other embodiments will be described in greater detail below.

BRIEF DESCRIPTION OF THE DRAWINGS

The invention may take physical form in certain parts and arrangements of parts, an embodiment of which will be described in detail in the specification and illustrated in the accompanying drawings which form a part hereof, and wherein:

FIGS. 24A to 24D illustrate example embodiments of a camera module and system using the camera module;

DETAILED DESCRIPTION OF ILLUSTRATIVE EMBODIMENTS

Figure 1B:
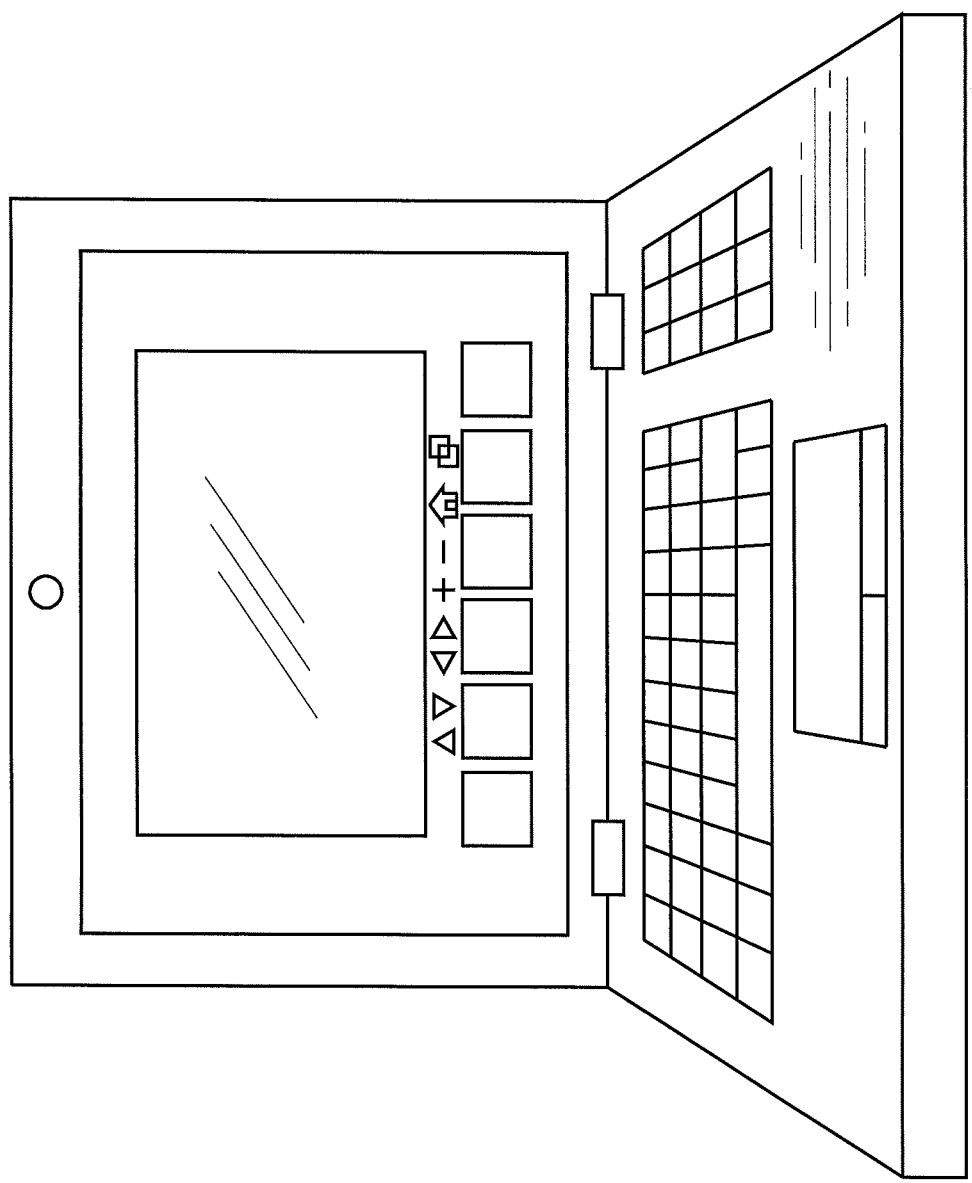
FIGS. 1A and 1B illustrate example techniques for viewing an environment.

Aspects herein generally relate to systems and methods for comprehensively capturing a target space or environment, as well as displaying or providing comprehensive captures of target spaces or environments. These travelable comprehensive immersions provide a completely unique experience based on the user, on the basis that they can be explored continuously in three dimensions using control input. They have no start, end, timeline, or path, and are based off actual recorded media of the target space as opposed to a digital model. Direction, movement, speed, elevation, location, viewing angle, and so forth are all placed in user hands with no duration or predetermined time element. By this arrangement, a user has degrees of freedom available to an in-person visitor or participant.

As used herein, a target space can be any space or environment, including both indoor and outdoor public or private spaces. A target space is comprehensively captured after a camera module maneuvers the target space while recording. Maneuvering the target space can include movement in three dimensions, and in various embodiments may include traveling a linear path through the space, travelling multiple paths through the space, travelling a gridded path or series of gridded paths through the space, travelling a curved path or series of curved paths through the space, traveling diagonals of the space, following a human-walked path through the space, et cetera. Maneuvering the target space can include travelling along or near walls or boundaries of the target space, and in some embodiments may then involve logically segmenting the space therein into sections, grids, curves, et cetera, either based on the dimensions of the target space or predefined intervals. In embodiments, maneuver can include a third, vertical dimension in addition to the area (e.g., floor or ground) covered, and the camera module can be held in a two dimensional location while multiple vertical views are collected, or the comprehensive maneuver can occur following the same or different two-dimensional paths at different heights. The same two-dimensional path(s) may be traveled more than once to vary parameters collected at the coordinate location within the space being captured. The camera module either continuously or according to a capture rate/interval records photographs or video of the space to provide combinable immersive views continuously or at discrete points for the entire maneuver. Comprehensively capturing a target space can also include maneuvering to or around focal points to provide still further views or other enhanced images of items of interest within the space.

The term "non-linear" is interpreted herein based on context. In particular uses, "non-linear" refers to geometry which is not defined by straight lines. In other uses, "non-linear" refers to an experience or immersion which is not defined according to a fixed start, end, or path therebetween. For example, a virtual home tour which follows a set path and provides particular angles of view along the path is a linear tour. A non-linear view would allow the user to depart from any path, move forward, backward, sideways, up, or down, and otherwise experience additional degrees of freedom not available a linear view.

As used herein, "smoothly maneuver" means to maneuver in a fashion not substantially subject to bumps, shaking, or other disruption modifying the intended path and orientation of the camera module there through. When camera modules are smoothly maneuvered, image quality is improved both in individual views and during stitching of different individual views into adjacent views.

When a target space is comprehensively captured through smooth maneuver, all images can be combined to produce a travelable comprehensive immersion. The travelable comprehensive immersion can be a file or group of files containing images, video, and/or other data representative of the target space combined in a manner that allows viewing of, movement through, and exploration of the target space in a non-linear and non-programmed manner. Because the space is "rebuilt" virtually—the camera module captures surrounding views in a variety of locations—the location and orientation of a viewer using the travelable comprehensive immersion can be modified in a substantially continuous manner, allowing movement to anywhere in the space and different viewing angles at any such point. In embodiments, these capabilities can be subject to a capture rate or interval, where discrete locations (e.g., 1 inch, 6 inches, 1 foot, 3 feet, 6 feet, and any other distance) are captured with interval gaps there between.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., does not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

Figure 1A:
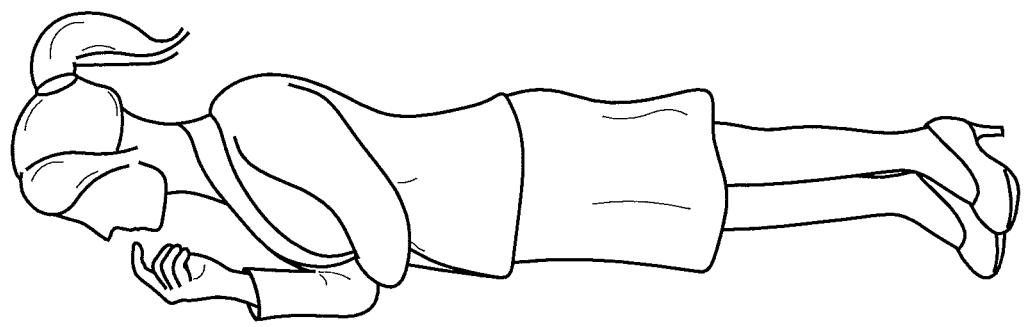

Turning to the figures, FIGS. 1A and 1B illustrate example techniques for viewing an environment. FIG. 1A shows a person in the environment. The person may be a guide for the environment, such as a realtor or customer service representative, or a person interested in but unfamiliar with the environment, such as a prospective buyer or tourist visiting for the first time. This provides the greatest flexibility and realism in viewing an environment inasmuch as the person can choose her location and viewing angle, but she must be physically present. Depending on the location and character of the environment, and capabilities and resources of the person, physical presence may not always be possible.

FIG. 1B shows a computer interface for, e.g., a virtual tour of the environment. The interface can include a main photograph, controls, and thumbnails of other photos. Based on the controls or selection of a thumbnail, the main photograph changes to provide a larger view of particular views in the environment. However, the environment can only be viewed in the very limited number of views available, thereby leaving large gaps and a stuttered, unrealistic viewing experience.

Figure 2:
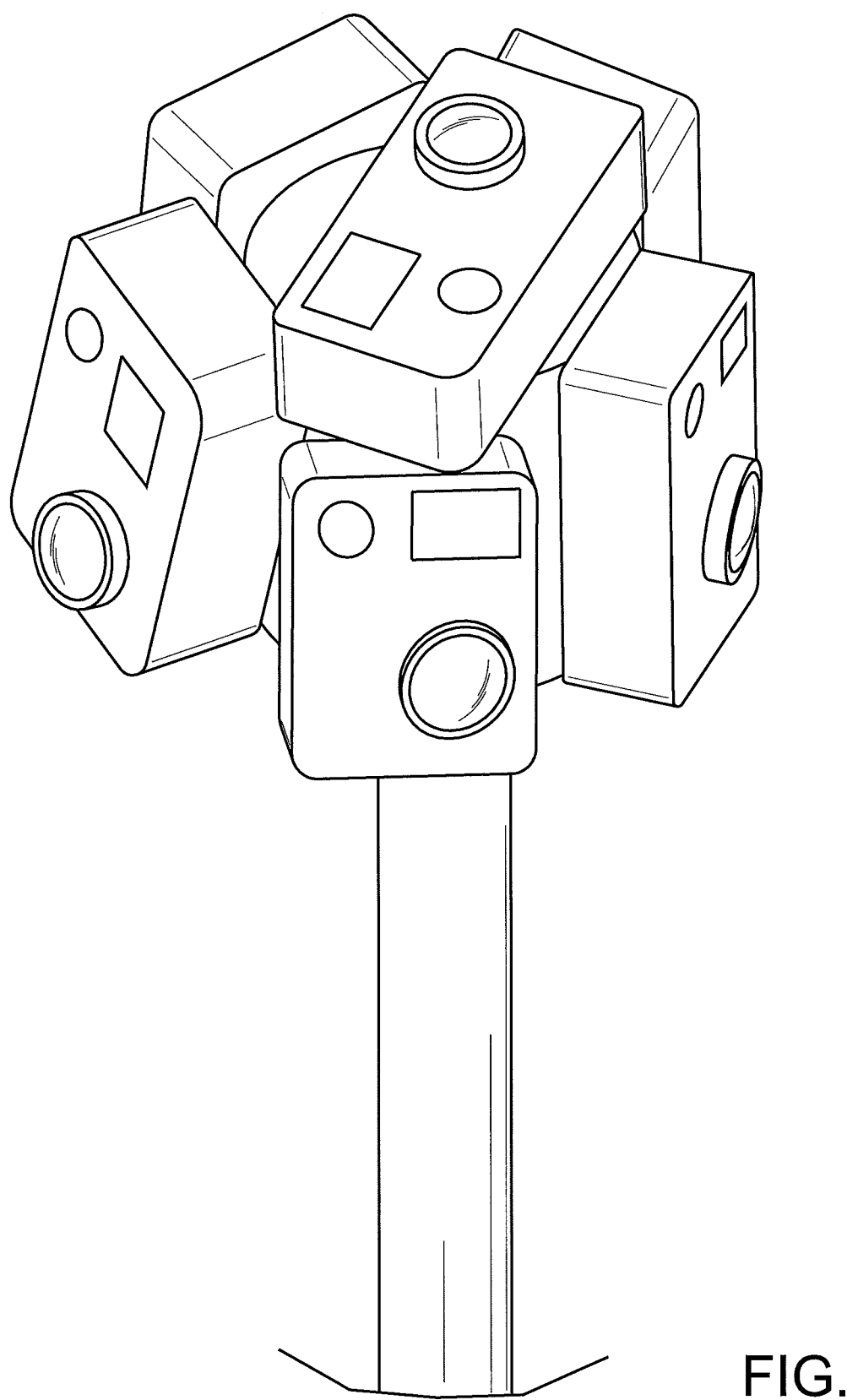
FIG. 2 illustrates an embodiment of a camera module for capturing an environment.

Limitations of the viewing techniques of FIGS. 1A and 1B can be reduced using comprehensive captures of environments. Comprehensive captures can be created using systems and methods disclosed herein. FIG. 2 illustrates an embodiment of an immersive camera module for capturing an environment. The camera module is an immersive camera module which collects an omnidirectional view using a plurality of cameras, providing a continuous view including rotational degrees of freedom similar to or exceeding those possessed by a person standing at the location in question. The camera module can include a mounting block having a plurality of camera mounting sites and the plurality of cameras mounted thereon. In embodiments, the cameras may be coupled without use of a camera mounting block (e.g., integral hardware facilitates their connection). The plurality of cameras are arranged such that each camera has a partially overlapping field of view with one or more adjacent cameras to facilitate collection of images sharing overlapping portions which can be merged by matching portions of different images to provide a comprehensive capture of the target space. In this fashion, the camera module is configured to comprehensively capture the target space.

In the illustrated embodiment, the camera module includes six cameras, with five mounted to provide a 360-degree panoramic view around the camera module and one mounted atop to allow upward viewing. In embodiments, the cameras may be mounted at angles to modify the field of view. For example, the panoramic series of cameras can include a slight downward tilt to reduce field of view overlap with the sixth camera directed upward, thereby maximizing the amount of unique image data in each immersive image constructed from individual camera images. The camera module(s) illustrated herein are provided for purposes of example only, and do not limit other possible camera module arrangements. In embodiments, other numbers of cameras can be utilized, and camera angles other than those pictured (e.g., downward, between top and side cameras, et cetera) can be employed without departing from the scope or spirit of the innovation. In an embodiment, a single camera capable of collecting data can be used. In other embodiments, any number of cameras greater than one can be used.

The cameras can provide images collected to temporary or persistent storage, or directly to an immersive video generation module for production of an immersive video of the target space. The cameras can utilize any wired or wireless means of communication and/or powering.

As partially shown in FIG. 2, the camera module can be operatively coupled to a chassis. The chassis is configured to smoothly maneuver the camera module comprehensively through the target space. This chassis is also visible in later figures.

Figure 3A:
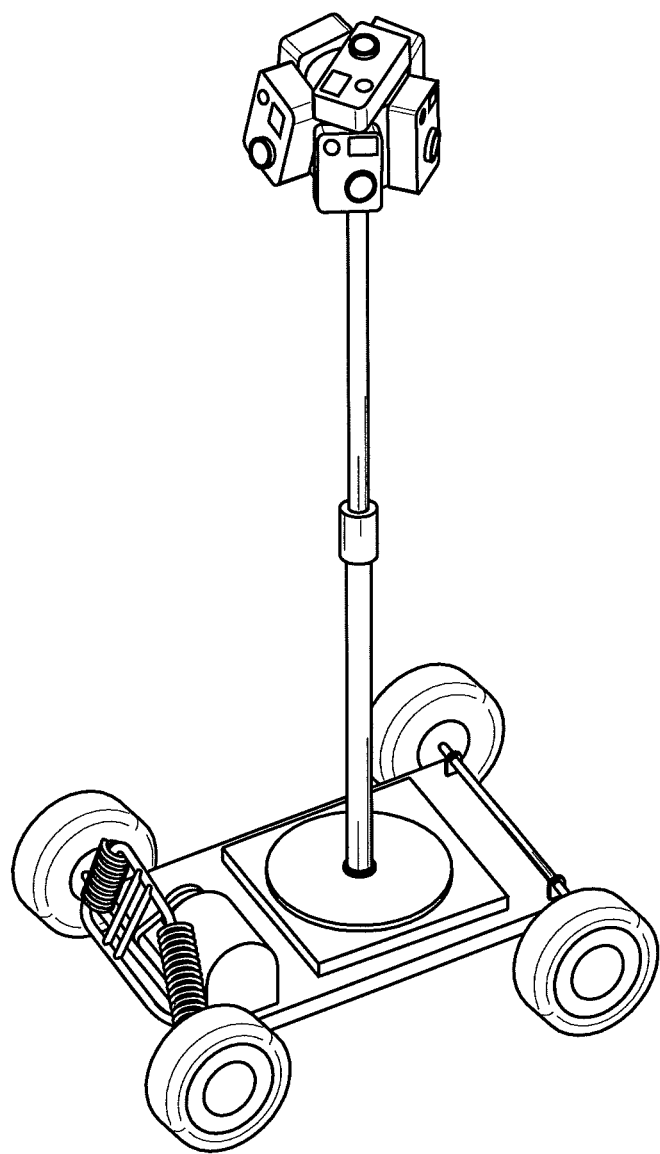
FIGS. 3A and 3B illustrate embodiments of camera modules coupled to chasses and vehicles for maneuvering the camera modules.
Figure 3B:
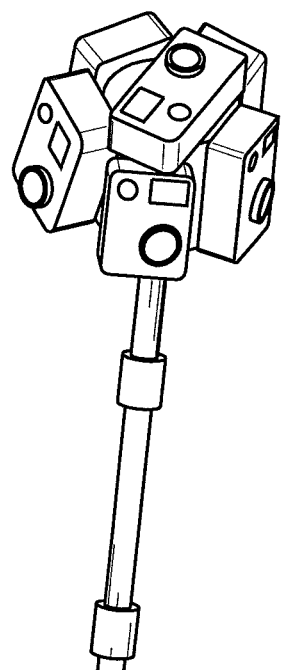

FIGS. 3A and 3B illustrate embodiments of camera modules coupled to chasses and immersive capture vehicles for maneuvering the camera modules. Specifically, chasses can be coupled to immersive capture vehicles which smoothly maneuver the chassis and immersive camera module comprehensively through the target space. As shown, immersive capture vehicles may have two or four wheels, or any other number. In an alternative embodiment, the immersive capture vehicle may move about on one or more spherical wheels, or one or more continuous tracks (e.g., "tank tread"). The propulsion mechanisms employed with the immersive capture vehicles can influence their speed, maneuverability (e.g., turning radius), capability for negotiating obstacles (e.g., a threshold, raised carpet, a staircase, and others) or terrain (e.g., wet surfaces, mud, snow, gravel, and others). Vehicle propulsion mechanisms can include, but are not limited to, various motors, engines, propellers, rotors, jets, et cetera, powered by combustibles, electricity, other power sources, and combinations thereof, and alone or in conjunction with gears, driveshafts, axles, et cetera.

Control of immersive capture vehicles can be manual, automatic, or combinations thereof. Accordingly, the immersive capture vehicle includes at least a vehicle logic module capable of managing maneuver of the immersive capture vehicle (e.g., direction and speed) by controlling its propulsion mechanisms. The vehicle logic module can be operatively coupled or include a communication module (e.g., to send and receive information), storage and/or a general or application-specific processor (e.g., storing data for use controlling movement, calculating paths of movement, modifying vehicle operation, and so forth), sensor modules (e.g., for collecting data about vehicle operation, for collecting data about the environment), and others. In an embodiment, sensor modules can include one or more of cameras, sonars, radars, lasers, and/or other means for detecting open and occupied spaces and distances therebetween. In embodiments, the same or different sensors than those used to collect the immersive capture data can be utilized. A sensor module can perform a scan in one or more directions, which can include a scan in all directions, from one or more positions in a space to be captured. Sensor data from the sensor module can be provided to a modeling module which develops a two- or three-dimensional map or model of the space to be captured. The modeling module can provide data to a path module which determines a path for a vehicle to travel while collecting imagery and other information related to the space to be captured.

In embodiments where control is automated, the logic module can receive information about a target space before beginning or discover information about the target space (e.g., using the sensor module) before or during comprehensive capture of the target space. Techniques by which the logic module can automatically capture spaces or capture spaces based on user input are discussed further below. In embodiments, a logic module can include a location module, which can utilize one or more location techniques such as a global positioning system, a triangulation technique, or other techniques providing an absolute location, or techniques for discovering a relative location at a distance (e.g., radar, sonar, laser, infrared). Logic can be provided to prevent collisions in the target space (with three-dimensional obstacles within the space) while immersive media is being collected.

In an embodiment, an immersive capture vehicle can be a robot. In an embodiment, an immersive capture vehicle can be a self-balancing automated device.

Figure 4D:
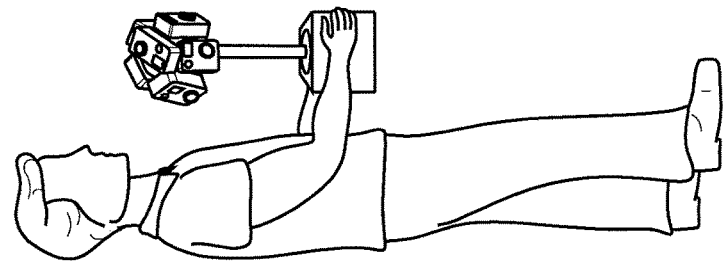
FIGS. 4A, 4B, 4C, and 4D illustrate embodiments of camera modules coupled to chasses and physical interfaces for human maneuver.
Figure 4C:
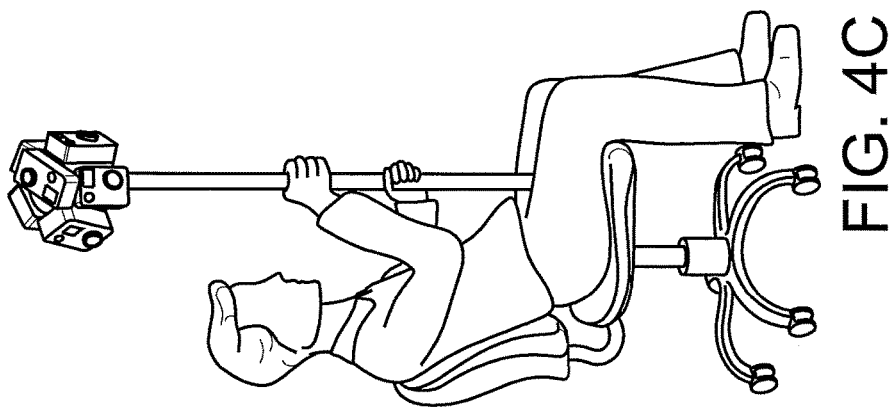
Figure 4B:
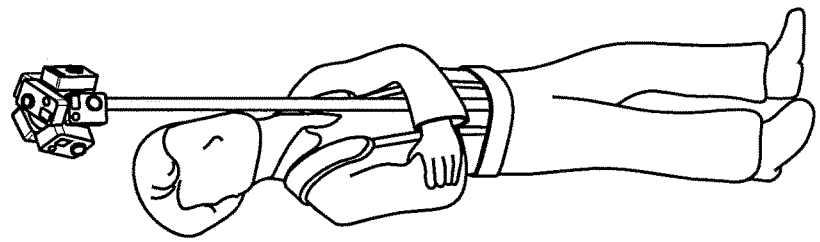
Figure 4A:
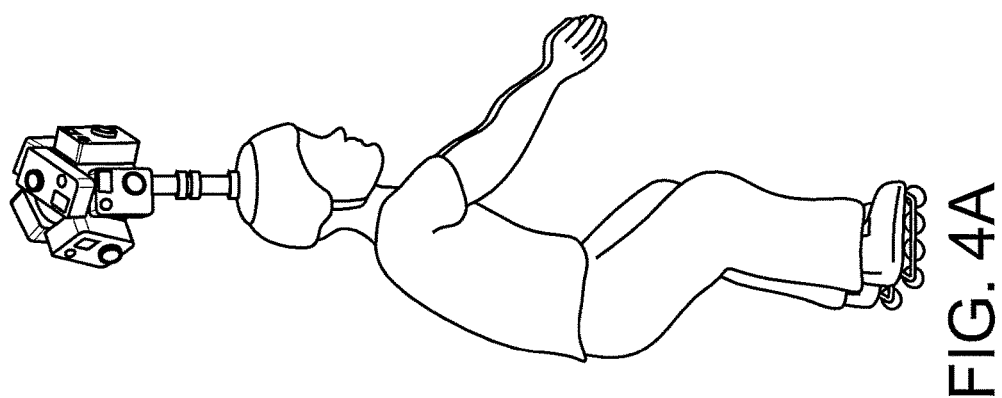

FIGS. 4A, 4B, 4C, and 4D illustrate embodiments of camera modules coupled to chasses and physical interfaces for human maneuver. Particularly, physical interfaces such as a helmet (FIG. 4A), a harness (FIG. 4B), or a grip (FIG. 4D) can be provided. Alternatively, the chassis itself can be gripped by a person (FIG. 4C). In embodiments, other components of the system can be integrated into the physical interface and/or chassis. For example, a computer readable storage media and/or hardware and/or software of an immersive video generation module can be maintained in, e.g., the grip of FIG. 4D.

Physical interfaces can include various aspects to improve ergonomics. For example, the physical interface and/or chassis can be pivot-able, extended or retracted, or otherwise adjustable to provide for ergonomic carriage facilitating smooth maneuver of the chassis and camera module. Where a person walks the system, smooth maneuver may or may not include substantially level or stable maneuver of the camera module, but may instead mimic human motion for a walking experience when viewed. Alternatively, a person can stabilize the human interface but be conveyed on another vehicle (e.g., rolling chair as in FIG. 4C) to reduce the impact of motion.

Figure 5:
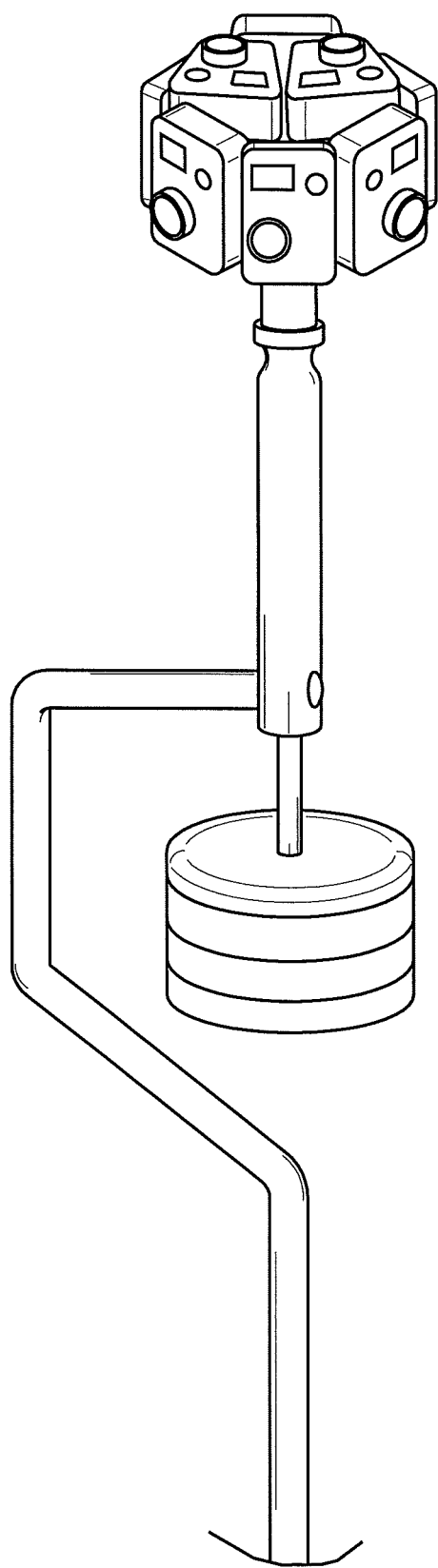
FIG. 5 illustrates an alternative embodiment of a chassis coupled to a camera module.

FIG. 5 illustrates an alternative embodiment of a chassis coupled to a camera module. Chasses herein can include an adjustment module to change the location or orientation of the camera module with respect to, e.g., a point on the chassis. This can include telescoping members, jointed members for pivoting or tilting, members which can spin, et cetera. As illustrated in FIG. 5, an adjustment module can include a pivot having a plumb thereunder. The adjustment mechanism including the pivot-plumb apparatus sets forth one technique for reducing or eliminating shake or tilt during starting and stopping of system movement or during other conditions such as uneven flooring. Other techniques can include, alternatively or complementarily, springs or suspensions, flexible joints, padding, et cetera. In an embodiment, a shock absorbing member can be placed in one or more portions of the embodiments of vehicle-borne, hand-held, or wearable embodiments of chasses to assist with image stabilization.

Figure 6B:
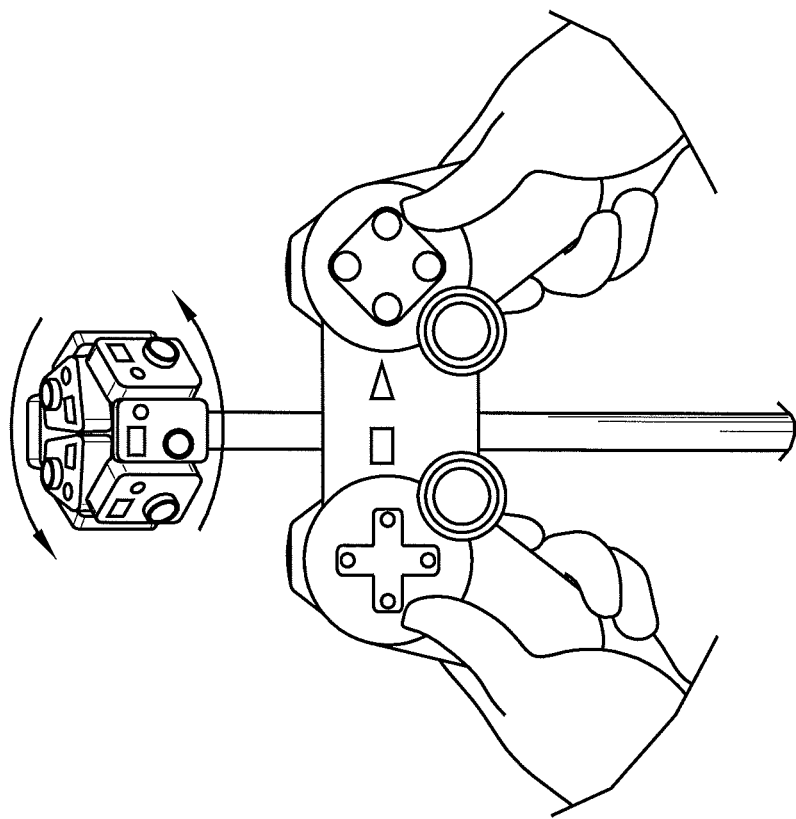
FIGS. 6A and 6B illustrate embodiments of techniques for controlling a camera module and/or elements operatively coupled therewith.
Figure 6A:
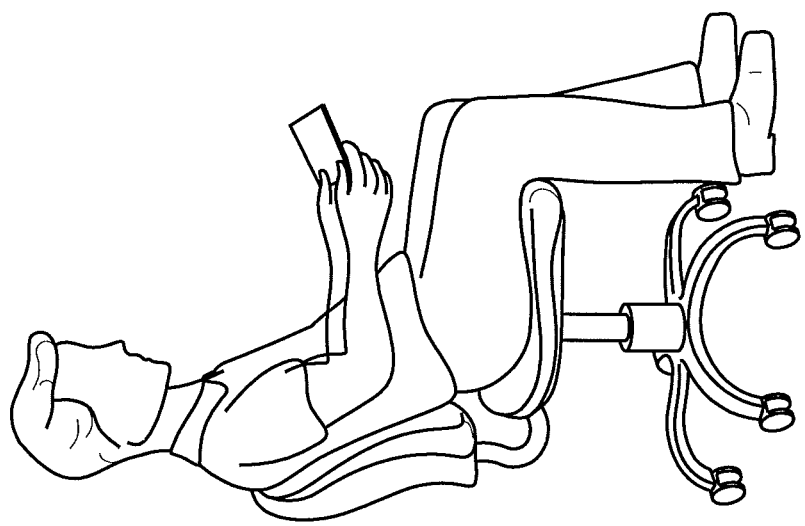

FIGS. 6A and 6B illustrate embodiments of techniques for manually or semi-automatically controlling a camera module and/or elements operatively coupled therewith. FIGS. 6A and 6B illustrate manual and/or semi-automatic techniques for control of a camera module or aspects operatively coupled therewith. FIG. 6A shows a tablet while FIG. 6B shows a video game style controller, both of which can be used for remote control of systems herein. Alternatives to touchscreens and controllers can include a mouse, keyboard, joystick, trackball, pointing stick, stylus, et cetera. In alternative embodiments camera control can be fully automated.

FIG. 6B specifically shows the controller used to control rotation (including angular velocity/acceleration) of the camera module on the chassis. However, in other embodiments, controllers can be used to start, steer, and stop immersive capture vehicles, enable or disable camera capture, adjust the camera module using an adjustment module of the chassis, et cetera. Actuators can be provided to various elements of the system and operatively coupled with a communication module to facilitate remote control. Further, in alternative or complementary embodiments, gesture-based feedback can be used for control (e.g., user head movement where elements controlled using wearable headgear).

Figure 7:
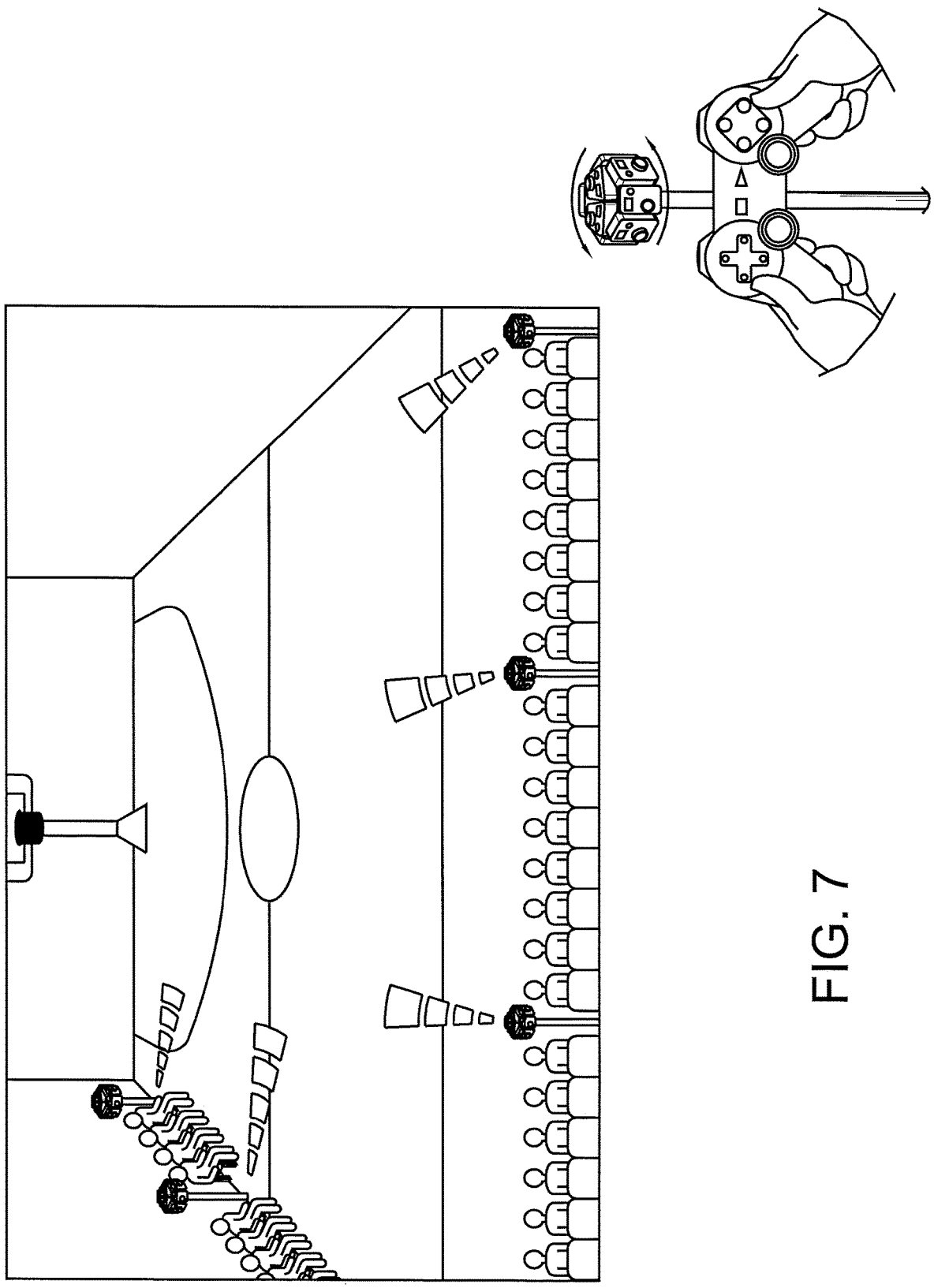
FIG. 7 illustrates embodiments of techniques for controlling a camera module and/or elements operatively coupled therewith.

FIG. 7 illustrates embodiments of techniques for controlling a camera module and/or elements operatively coupled therewith. In the illustrated embodiment, a controller can be used to control one or more camera modules present at a remote event. In this manner, a more realistic virtualization of attendance at a remote event can be effected. While camera modules herein can be movable, in at least one embodiment, substantially static chassis can be provided at, e.g., seat locations in a sporting event. Simulating attendance (e.g., based on a pay-per-view arrangement, a subscriber service, affiliation with a team, et cetera) users can control camera modules to experience the remote event. This experience can be provisioned in real-time or at a later time based on recorded immersive media capture.

Figure 8A:
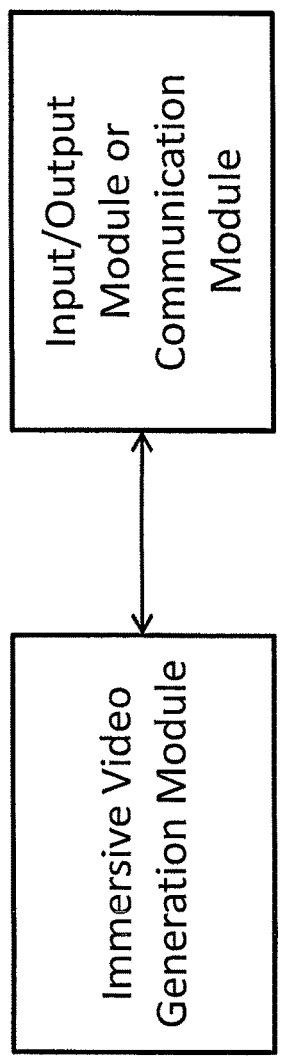
FIGS. 8A and 8B illustrate modules used for capturing an environment.
Figure 8B:
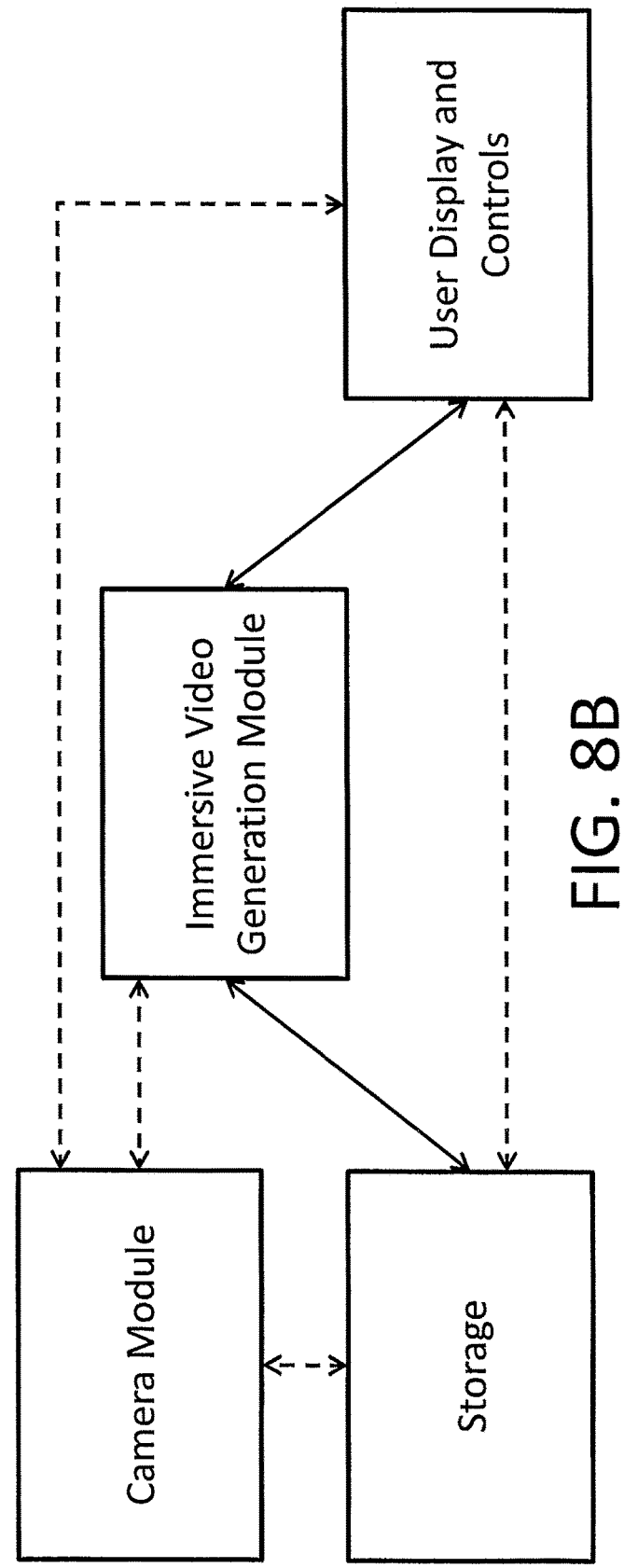

FIGS. 8A and 8B illustrate modules used for capturing an environment. The media produced comprehensively capturing a target space can be provided to an immersive video generation module which combines the images to create a travelable comprehensive immersion. As shown in FIG. 8A, the immersive video generation module can be operatively coupled with, e.g., an input/output or communication module to receive media for processing and to provide the generated travelable comprehensive immersion.

FIG. 8B shows an alternative arrangement showing in greater detail an example flow of information. The immersive camera module collects immersive media, and in embodiments can be at least partially controlled by a user control. The immersive camera module provides collected media to one or both of storage media and the immersive video generation module. The immersive video generation module outputs at least one travelable comprehensive immersion, which can be provided to user displays and controls either via storage or directly from the immersive video generation module.

As will be appreciated, the arrangements illustrated in FIGS. 8A and 8B are provided for example purposes only, and the modules present as well as their arrangement and information flow can vary without departing from the scope or spirit of the innovation.

Figure 9:
FIG. 9 illustrates aspects of techniques for capturing an environment.

FIG. 9 illustrates aspects of techniques for capturing an environment. Specifically, a user can use a computer or another device to provide signals or pre-program a system to comprehensively capture a space automatically or semi-automatically. In embodiments, walls can be virtually (e.g., using an interface for programming comprehensive capture) or physically (e.g., using visible or invisible light wavelengths, applying color to walls, applying markers to walls) marked to aid with at least combining of media to produce a travelable comprehensive immersion of the target space. In embodiments, light or markers invisible to the human eye can be used to avoid changes to the environment and/or any need for image processing to remove added elements.

Figure 10:
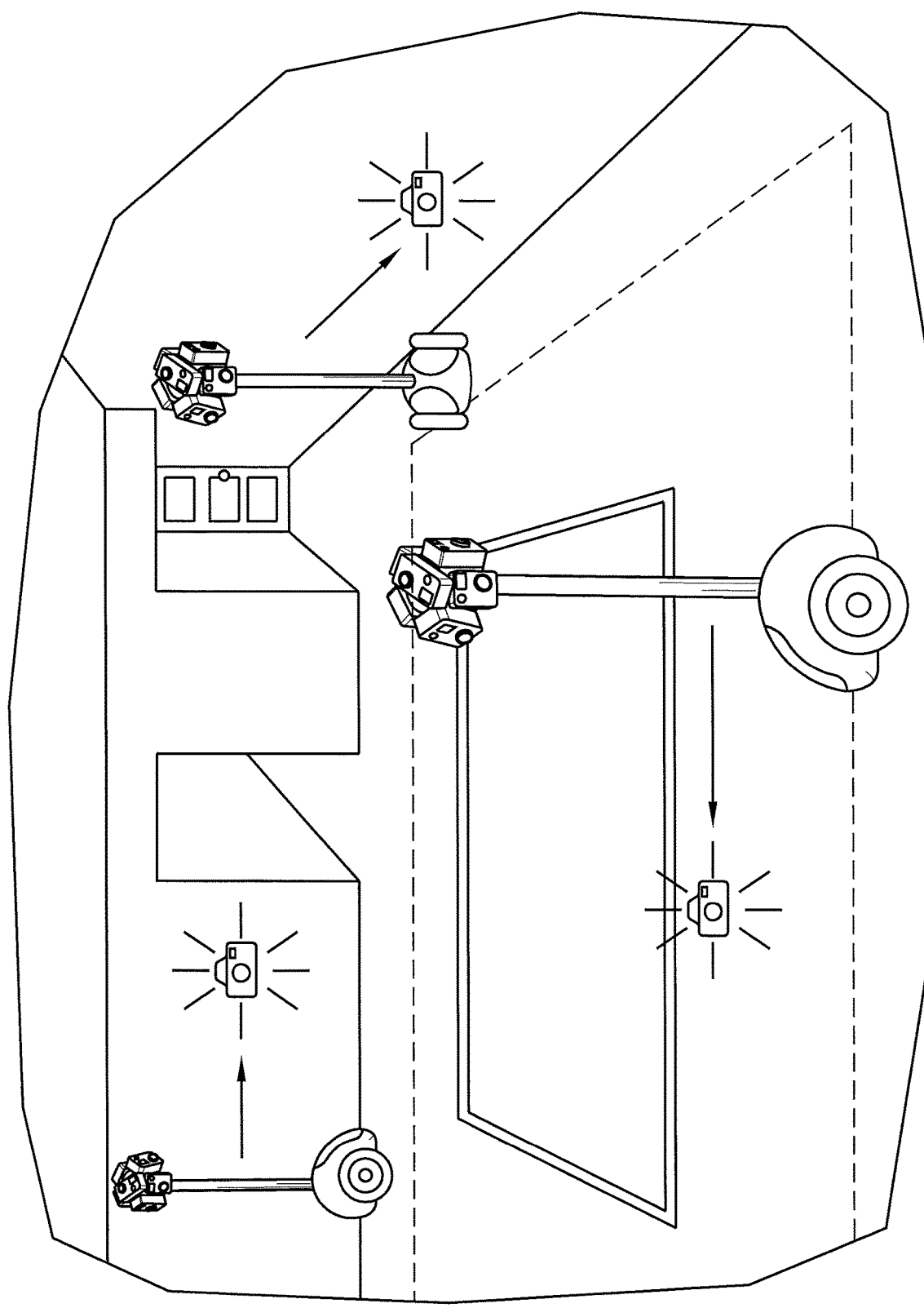
FIG. 10 illustrates aspects of techniques for capturing an environment.

FIG. 10 illustrates aspects of techniques for capturing an environment. As shown in FIG. 10, an immersive capture vehicle can transport a camera module and connecting chassis about the exterior of a room, near or against the room's walls. After completing its loop, the room may be adequately imaged in some embodiments, or the interior of the room can be maneuvered (e.g., according to a pattern or pre-planned path) to provide additional full-resolution views from within the target space. In embodiments, the target space can be mapped (or a path created therein) prior to recording and maneuvering, or the target space can be mapped during maneuvering and recording (e.g., interior is discovered by maneuvering about the exterior). An immersive capture vehicle need not perform an exterior/perimeter first path in all embodiments, and in various embodiments may start from an interior, move in and out, move in circles, a grid, diagonals, a cloverleaf pattern, et cetera.

Figure 11C:
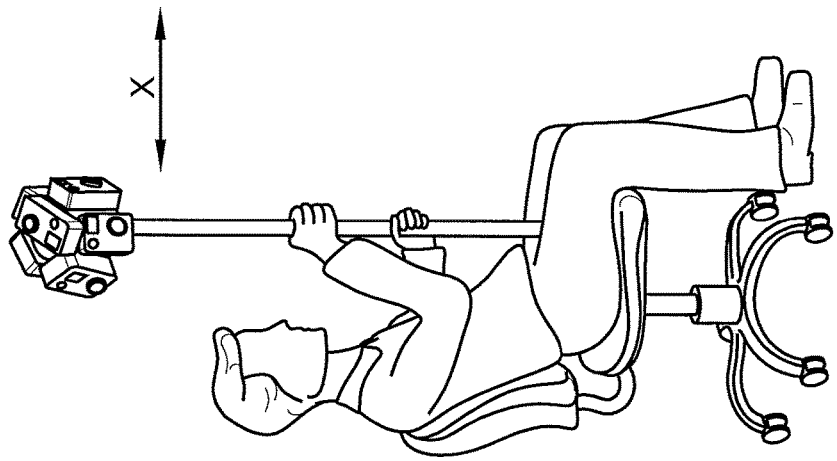
FIGS. 11A to 11C illustrate aspects of techniques for capturing an environment.
Figure 11B:
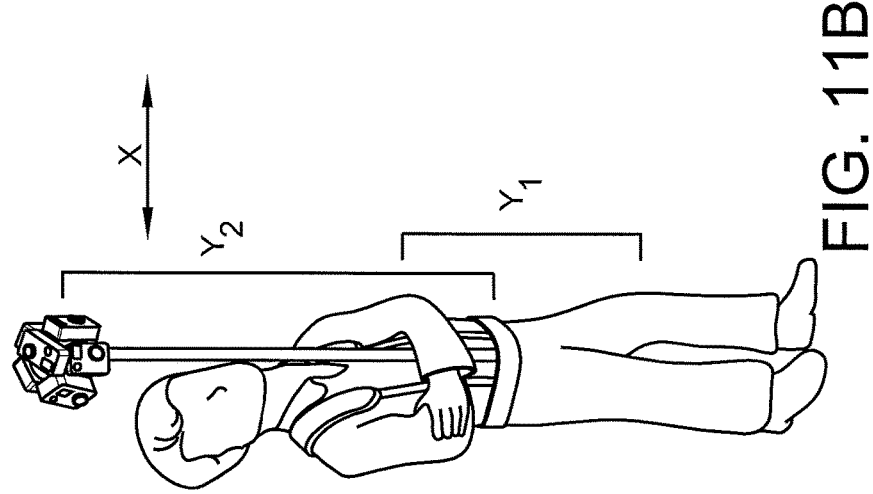
Figure 11A:
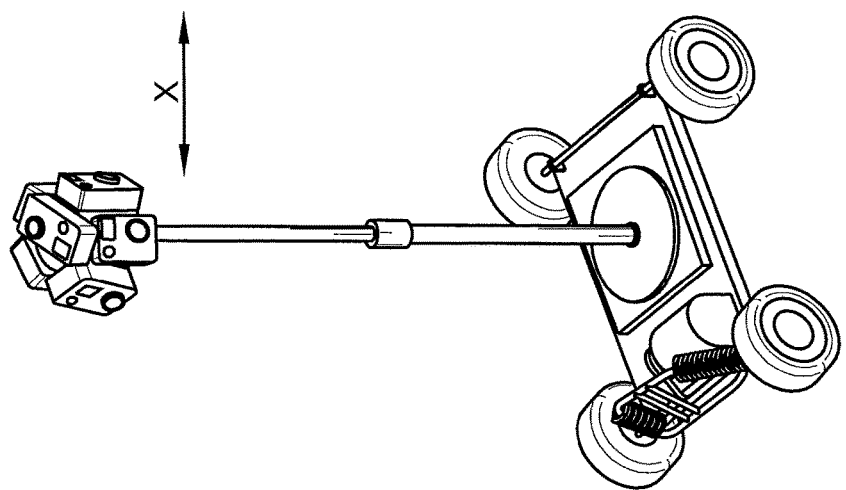

FIGS. 11A to 11C illustrate aspects of techniques for capturing an environment. While FIG. 10 and other drawings herein can take continuous imaging during maneuver, in embodiments pictures can be taken at relative or absolute intervals during maneuver. Thus, as can be appreciated in FIGS. 11A to 11C, a target resolution or capture rate can determine how frequently immersive media is captured. In FIGS. 11A to 11C, the camera module can advance by a distance of x between immersive media capture instances. In embodiments, x can be an increment of, e.g., 1 inch, 6 inches, one foot, two feet, three feet, six feet, or more, any amount there between, or any amount greater or less.

FIG. 11B in particular also demonstrates how the height of a camera module can be identified. The chassis can be supported at a height of $y_1$ while the camera module is located at a height of $y_2$ dependent upon the $y_1$ and the (fixed or variable) length of the chassis.

Figure 12A:
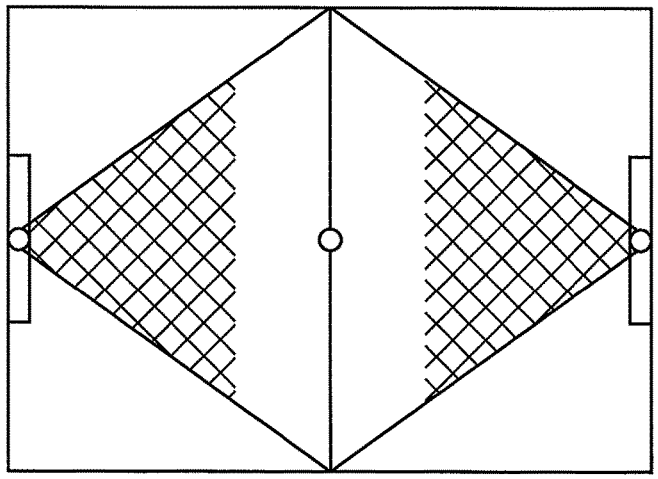
FIGS. 12A to 12C illustrate aspects of techniques for capturing an environment.
Figure 12B:
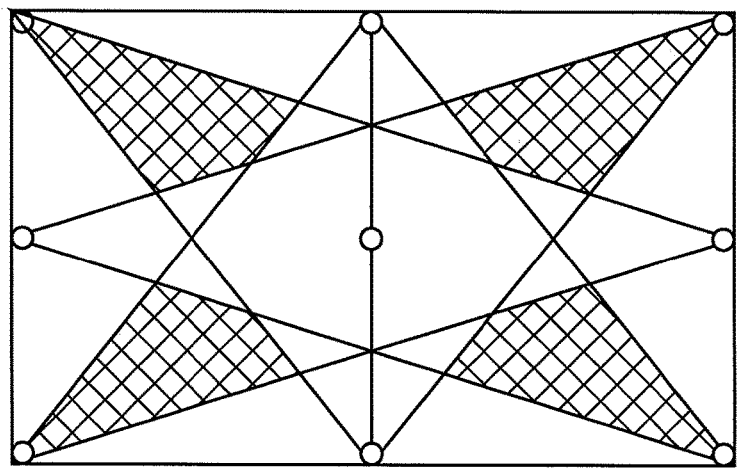
Figure 12C:
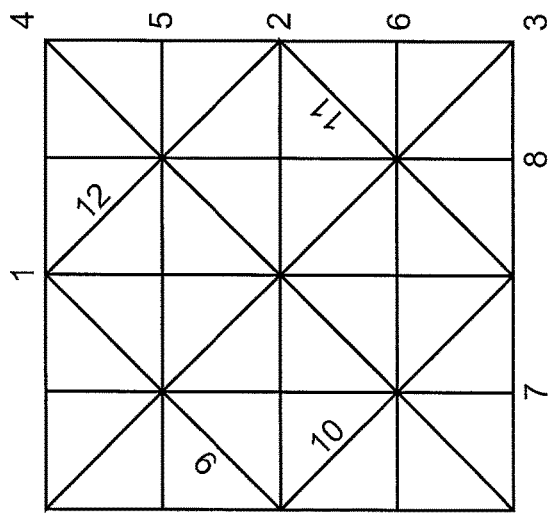

FIGS. 12A to 12C illustrate aspects of techniques for capturing an environment. Specifically, FIG. 12A illustrates the fields of view captured by two cameras in opposing positions. Knowledge of the field of view (e.g., as an angle) of one or more cameras (alone or in a camera module having a plurality of cameras) can be used to determine the amount of a target space captured from a given location. In embodiments, cameras are of a resolution facilitating the use of zoom to comprehensively capture the area, allowing for the use of fixed-location camera modules or obviating the need for the camera module to be maneuvered over every piece of the target space because aspects can be enlarged, enhanced, processed, interpolated, et cetera, to provide views and resolution at a distance. FIG. 12B illustrates the additional space captured (as well as space overlapped) by locating single cameras or multi-camera modules at additional sites in a target space.

FIG. 12C illustrates another example in which twelve paths can be travelled by a moving camera module to provide immersive media comprehensively capturing a square target space. Zoom features can be employed based on video tracks shot at another time being combined as disclosed herein allowing the user to experience the target space in any location or orientation without a sense of confinement to the lines of the earlier-imaged video. This example is provided for illustrative purposes only, and it is understood on review of the disclosures herein how this concept can be extended to any target space.

Figure 13:
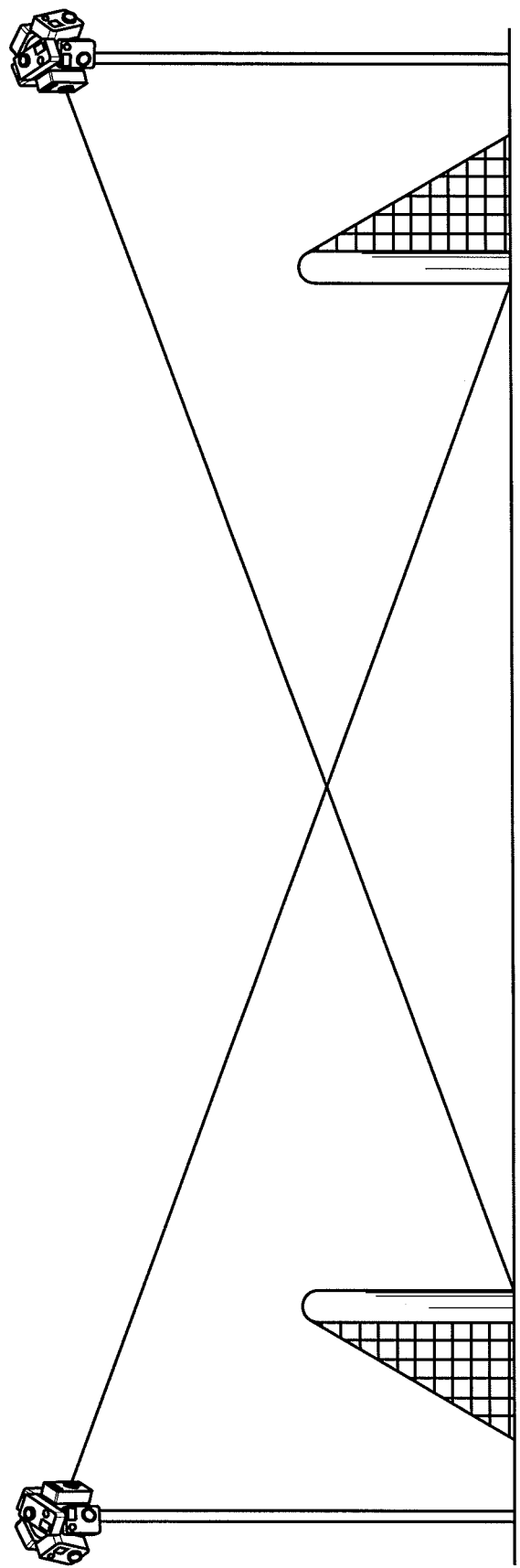
FIG. 13 illustrates aspects of techniques for capturing an environment.

FIG. 13 illustrates aspects of techniques for capturing an environment. Specifically, FIG. 13 illustrates camera module arrangement positioned about an event field (e.g., with opposing goals). The field of view is represented using lines extending from the cameras to how the field area is covered with opposing camera modules. This can be employed with techniques such as, e.g., those shown in FIGS. 12A and 12B.

In particular embodiments such as those of FIG. 13, a user can be enabled to stand in the middle of an event without disruption using combined immersive media from multiple angles. The immersion can include views that appear at eye-level from points where no attendee would be permitted to stand. In embodiments, an immersive video generation module can include an algorithm for combining or stitching opposing or offset camera views to create stitched live-video views without requiring a camera module in that location. In this fashion, users may, for example, view from "within" a sports game, seeing players run around them without any disruption to the players. In an embodiment, a synthesis module can synthesize a view from a location at which no camera is present based on processing of image data from other camera views and/or knowledge of the geometries of the target space.

Figure 14:
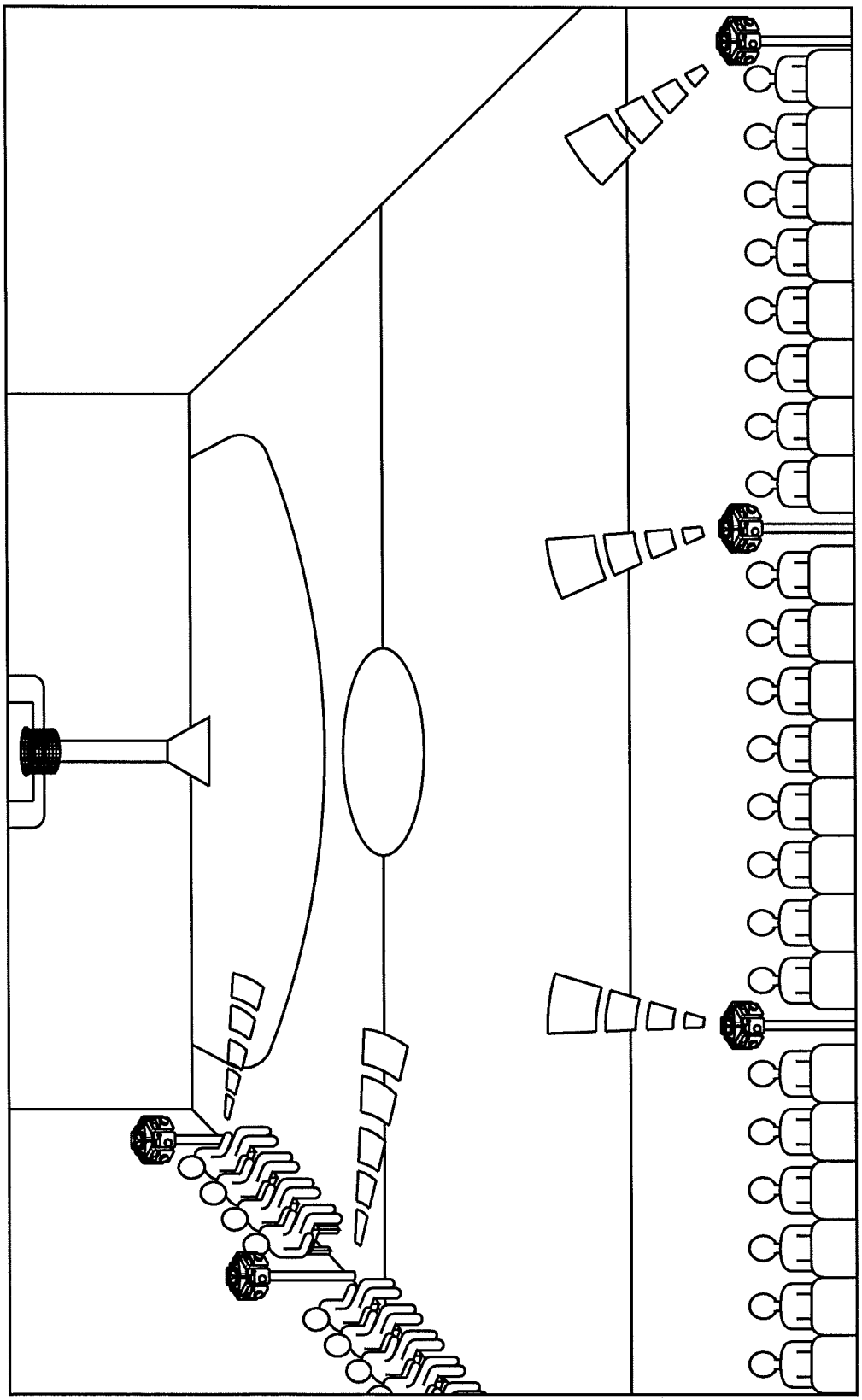
FIG. 14 illustrates aspects of alternative techniques for capturing an environment.

FIG. 14 returns to aspects of capturing an environment relating to a remote event. Virtual attendance can be simulated either during the event or in an immersive replay. In an embodiment, multiple camera modules can be combined treating their location as an interval, and using various zoom and image processing can provide views within the space there between. While the camera modules are shown directed towards the event (e.g., basketball court), global media may be collected to allow a remote attendee to look at other aspects (e.g., the crowd).

Embodiments such as that of, e.g., FIG. 14 can provide for a premium location for virtual attendance. Further, access to areas not available to physical attendees (e.g., locker rooms, warm-up areas, bench or dugout, and others) can be provided through camera modules located thereabout.

Figure 15:
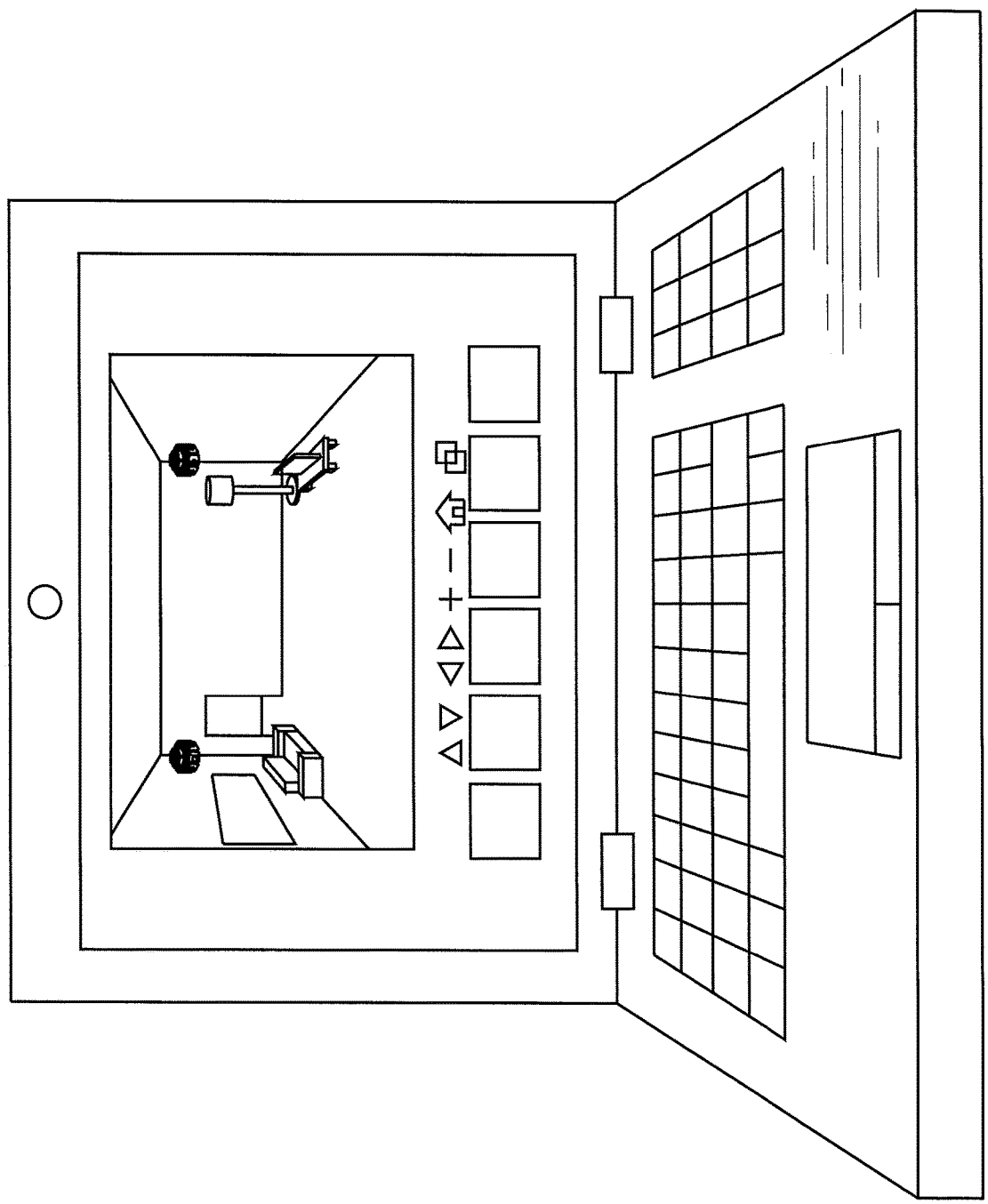
FIG. 15 illustrates an example embodiment of viewing an environment.

FIG. 15 illustrates an example embodiment of viewing an environment. In the embodiment of FIG. 15, a computer can be used to navigate a travelable comprehensive immersion. Rather than discrete movements between views selected by a third party, the entire space is continuously explore-able by the user, who can translate or rotate with up to six degrees of freedom throughout the boundaries of the target space (e.g., walls of a structure). An immersion engine such as those disclosed herein can produce a travelable comprehensive immersion which can then be provided from the engine or from storage to a viewer (e.g., custom application, internet browser, other display). The viewer can control the immersion using controls such as a mouse or pointer, keyboard, and/or touch screen, et cetera.

When displaying the immersion, a travelable comprehensive immersion can be received (e.g., from storage and/or an immersive video generation module). An initial viewer state of the travelable comprehensive immersion is displayed (e.g., entryway, initial location programmed into immersion, initial location selected by user). User input can then be received related to the travelable comprehensive immersion. Based on the user input, a subsequent viewer state can be displayed.

The subsequent viewer state can differ from the initial viewer state in at least one of viewer position (e.g., location within the target space) or viewer orientation (e.g., viewing direction at a location within the target space). Additional changes provided in subsequent state(s) can include environmental changes not based on user input, such as moving water, motion of the sun, curtains moving due to open window, et cetera. In this regard, the environment of the target space can be dynamic.

Immersions can be provided using remote storage. In an embodiment, an immersion is provided on a software-as-a-service basis or from a cloud hosting site. Billing can be based on the number of times an immersion is accessed, the time spent in an immersion, and so forth. Recording and/or viewing technology can also be provided as a service, and both viewing applications and immersion content can be provisioned wholly remotely.

Figure 16:
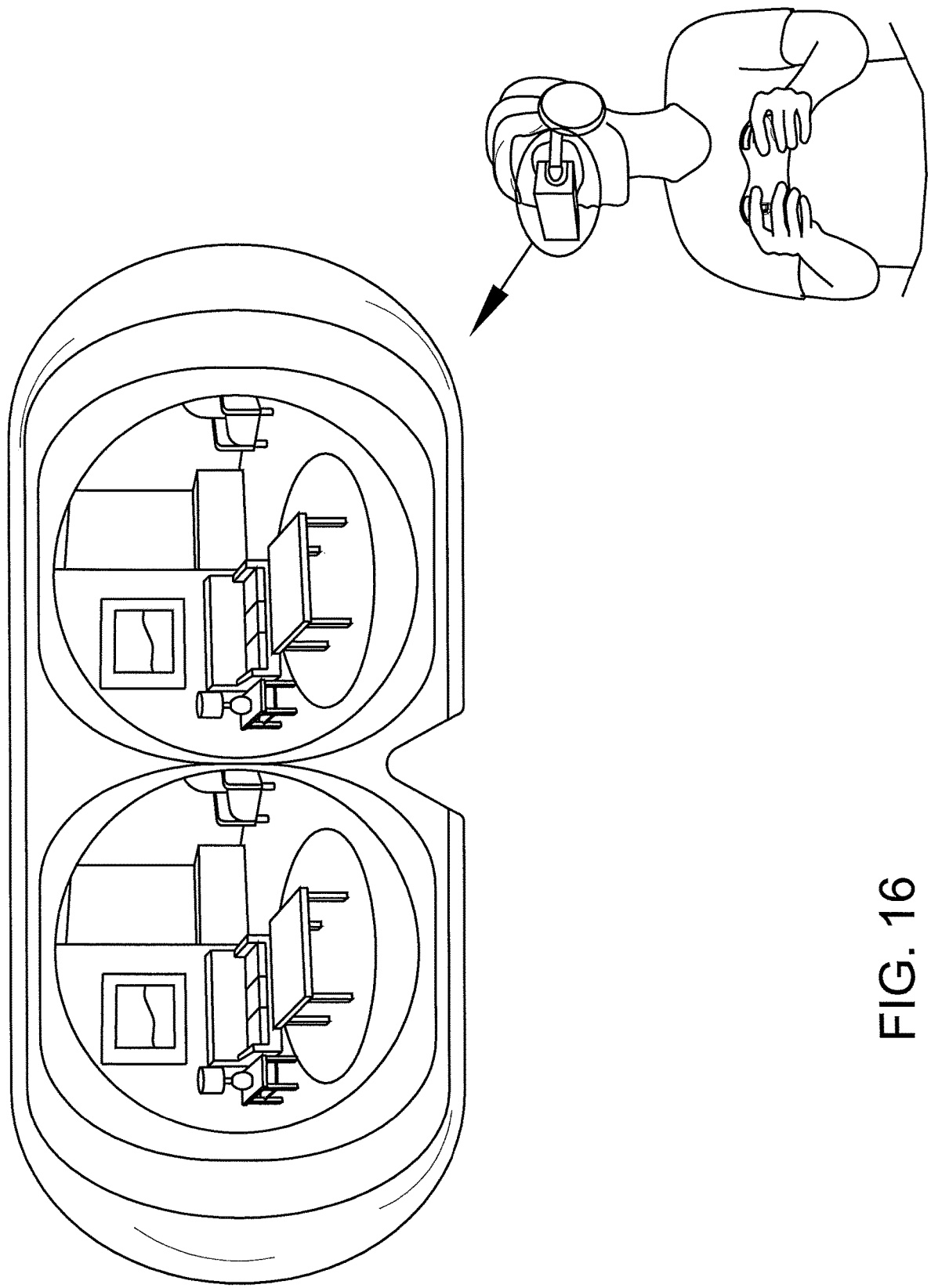
FIG. 16 illustrates an alternative or complementary example embodiment of viewing an environment.

As suggested by FIG. 15, while collection of target space media is immersive, its display can be immersive (e.g., spherical view) or semi-immersive (e.g., unlimited maneuver on conventional display). FIG. 16 illustrates an alternative or complementary example embodiment of viewing an environment which is fully immersive by use of providing media which fully catches the user's audiovisual senses using a worn virtual reality display over both eyes and optionally headphones over the user's ears. Where headphones are provided, audio tracks including environmental noise and automatic or selectable audio general to the target space or relating to specific locations in the target space can be provided. Thus, a virtual tour using systems and methods herein can provide music or local noise from the target space, or can include voice tracks or other audible information related to the tour which can be provided at the user's speed and based on the user's interest in the target space.

Figure 17:
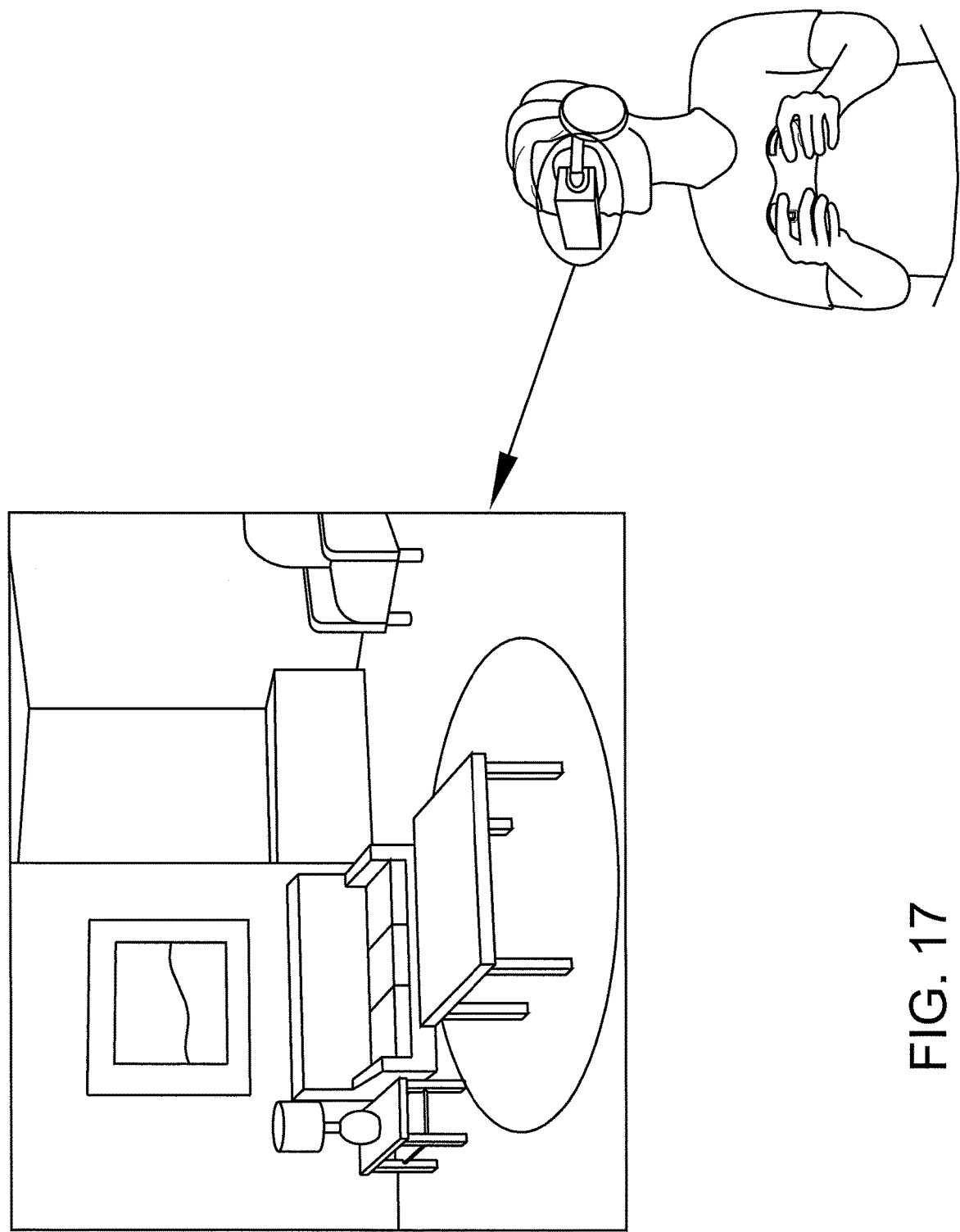
FIG. 17 illustrates an alternative or complementary example embodiment of viewing an environment.

FIG. 17 illustrates an alternative or complementary example embodiment of viewing an environment. A travelable comprehensive immersion can be provided on a single screen or dual screens (one for each eye) in a virtual reality headset. The travelable comprehensive immersion can be controlled using a controller (e.g., shown in FIGS. 16 and 17), user movement (e.g., head movement while wearing the virtual reality headset), or user gestures. Further, sensors (e.g., accelerometer, gyroscope, cameras) can be provided on user extremities or elsewhere on the body to enable intuitive gesture control.

Figure 18:
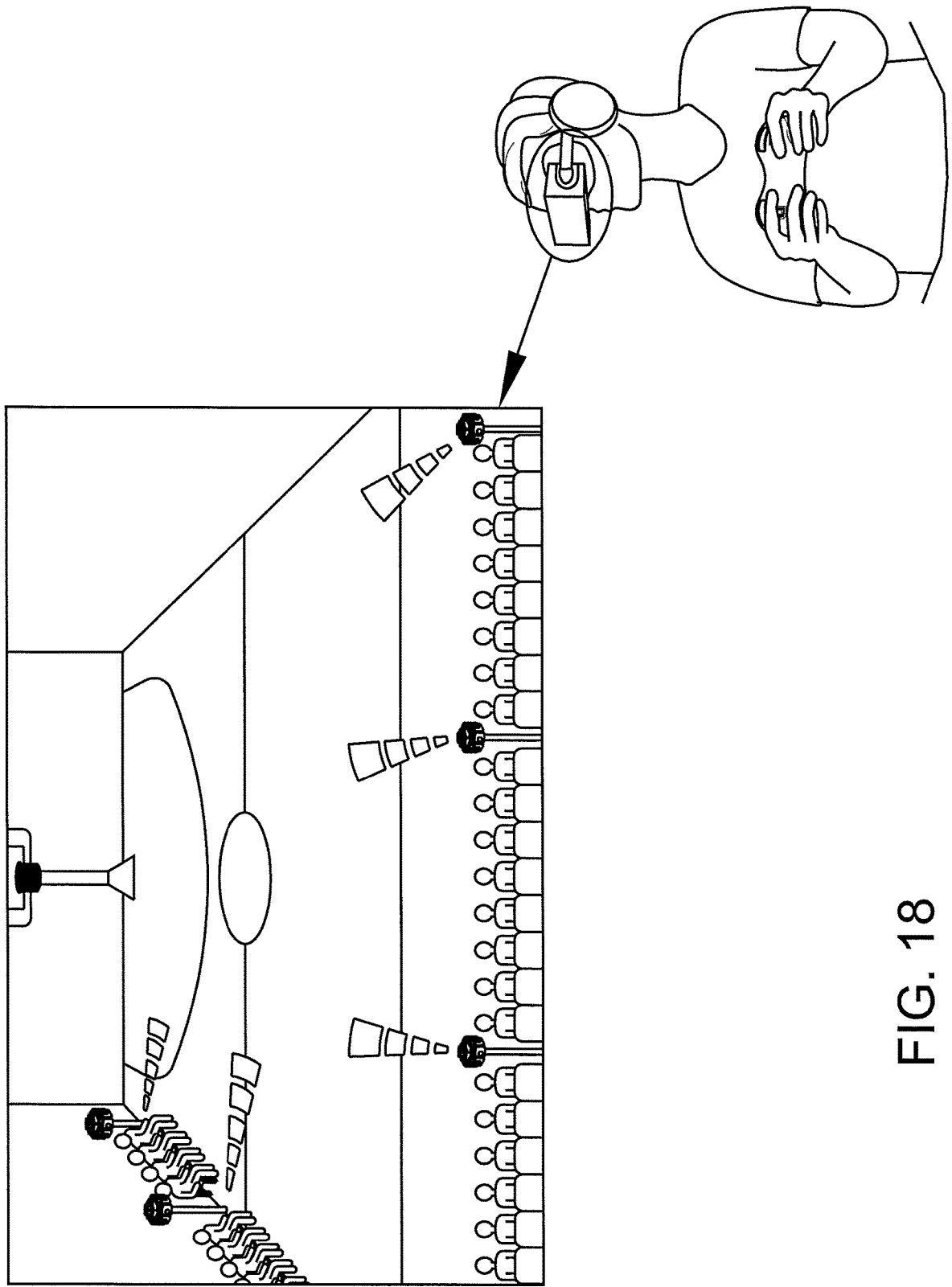
FIG. 18 illustrates an alternative or complementary example embodiment of viewing an environment.

FIG. 18 illustrates an alternative or complementary example embodiment of viewing an environment. As discussed, the user may attend a remote event using techniques herein. As shown, the user is viewing the court from a camera module located above and beyond the courtside modules. However, in embodiments, the user can swap view to and/or control the other cameras visible in the field of view provided.

Figure 19:
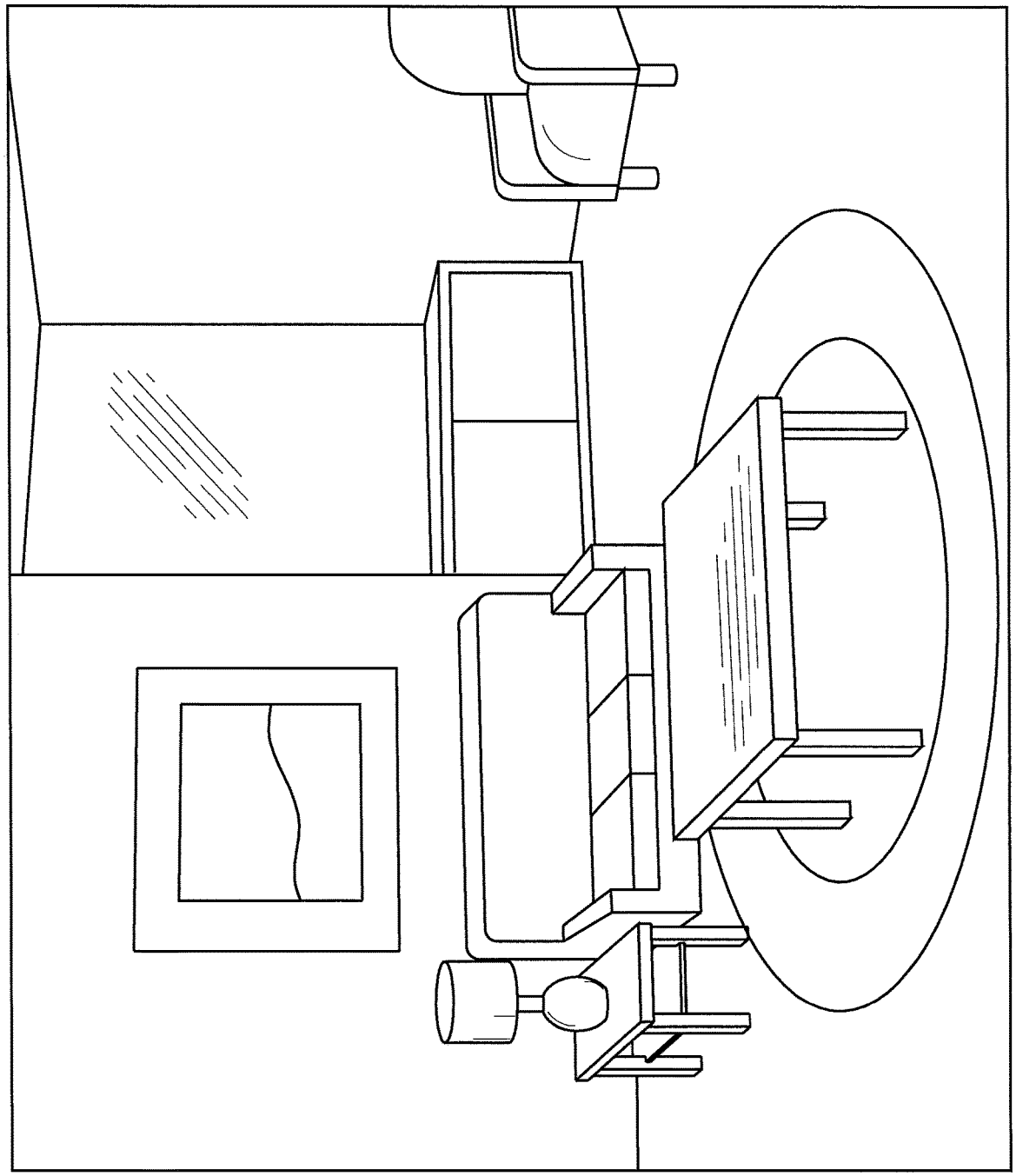
FIG. 19 illustrates an example environment for supplemental content.

FIG. 19 illustrates an example environment for supplemental content. In the example provided, a target space includes various household furnishings. Users may be interested in these furnishings, either based on their interest in the target space or based on a virtual reality retail experience. Supplemental content can be located and provided based on access to local or remote databases in conjunction with machine vision and image processing to identify items in a user's field of view and query information related thereto.

Figure 20:
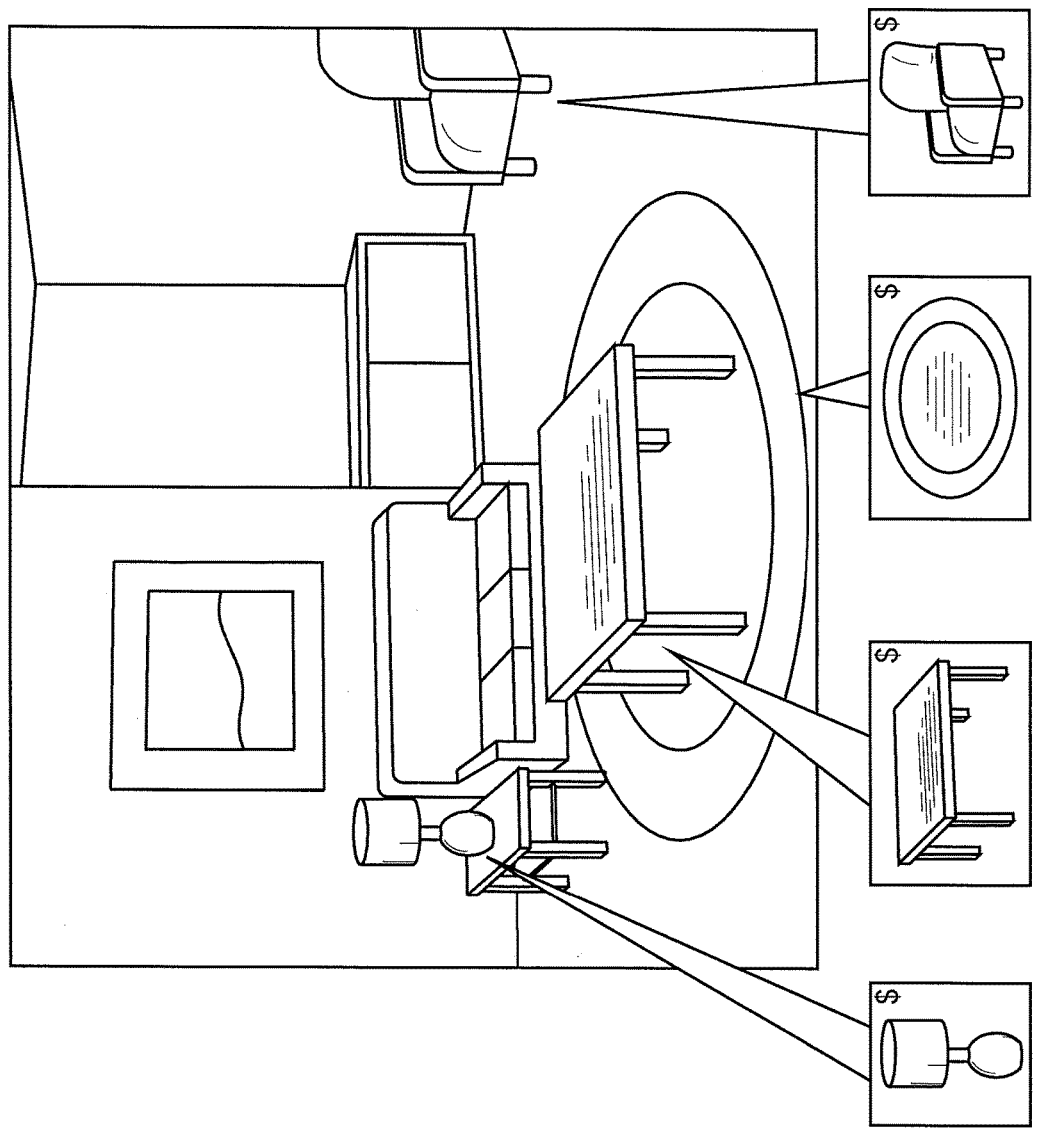
FIG. 20 illustrates an example environment including supplemental content.

FIG. 20 illustrates an example environment including supplemental content. One or more of the supplemental content items providing additional views, price details, et cetera, related to the furnishings in the target space can be shown in the display. These are only a few examples of the user's control to access further information regarding items in a target space. Such information can automatically populate based on the user's view, be provided based on user selection using a controller or gesture (e.g., press button, reach out or pointing toward item, and so forth). The information can contain links or information for purchasing, or purchasing can be completed entirely in the travelable comprehensive immersion.

Figure 21:
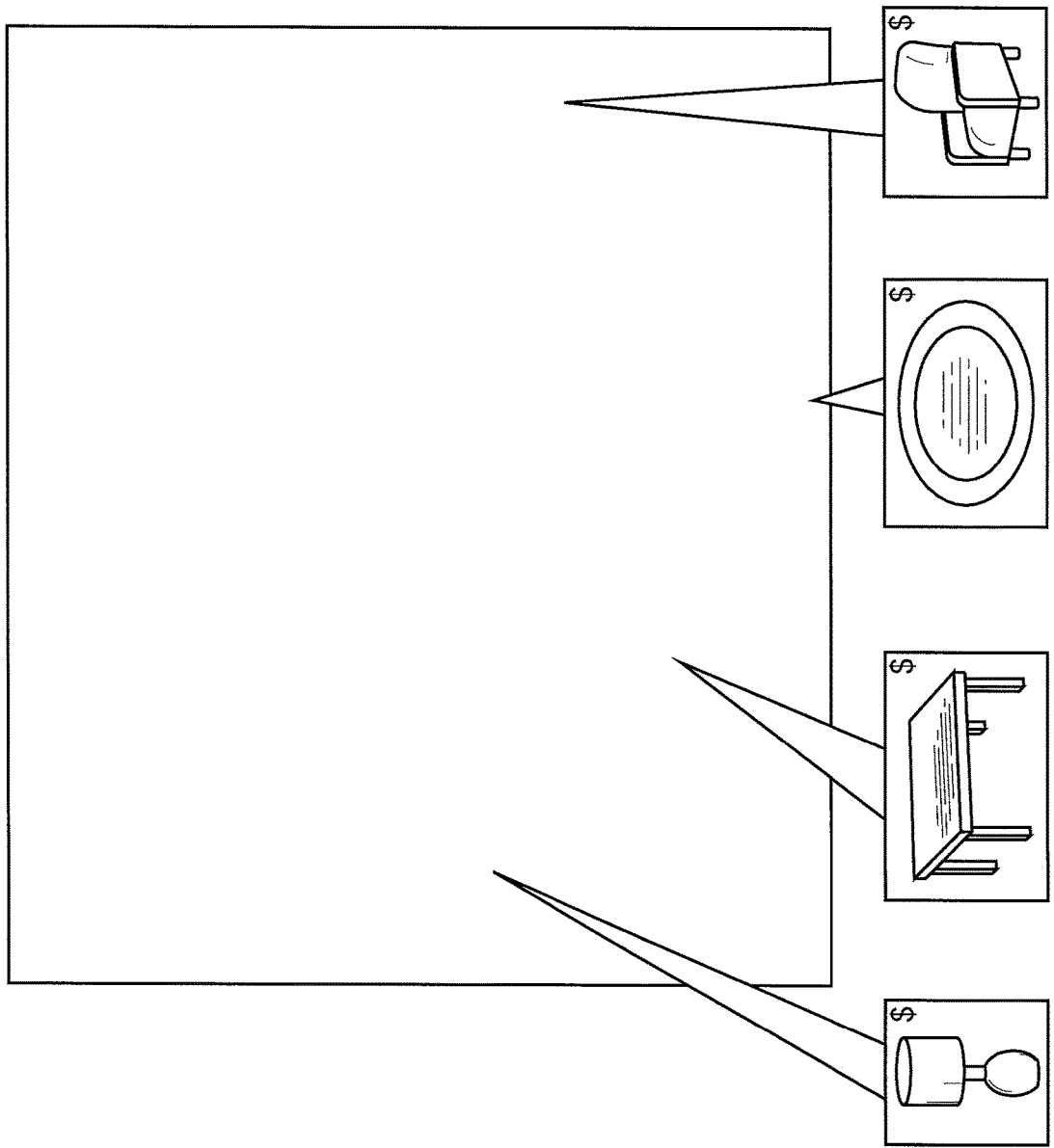
FIG. 21 illustrates example supplemental content.

FIG. 21 illustrates example supplemental content which can be superimposed over an environment. Supplemental content may be provided separately from the travelable comprehensive immersion, and in embodiments a supplemental content module can augment or superimpose supplemental content on an immersion without leveraging the immersive video generation engine or modifying the underlying immersion file(s). In embodiments, non-supplemental content can be modified through machine vision and image processing, including the removal of items, fixtures, accessories, et cetera, in the field of view.

In an alternative embodiment, supplemental content can be provided to a target space where the user is present in the target space and using a transparent or translucent virtual reality headset. In this fashion, a supplemental content module acts in a standalone manner to show virtual items in the space or provide information about virtual or real items in the space visible through the virtual reality headset providing superimposition.

Figure 22:
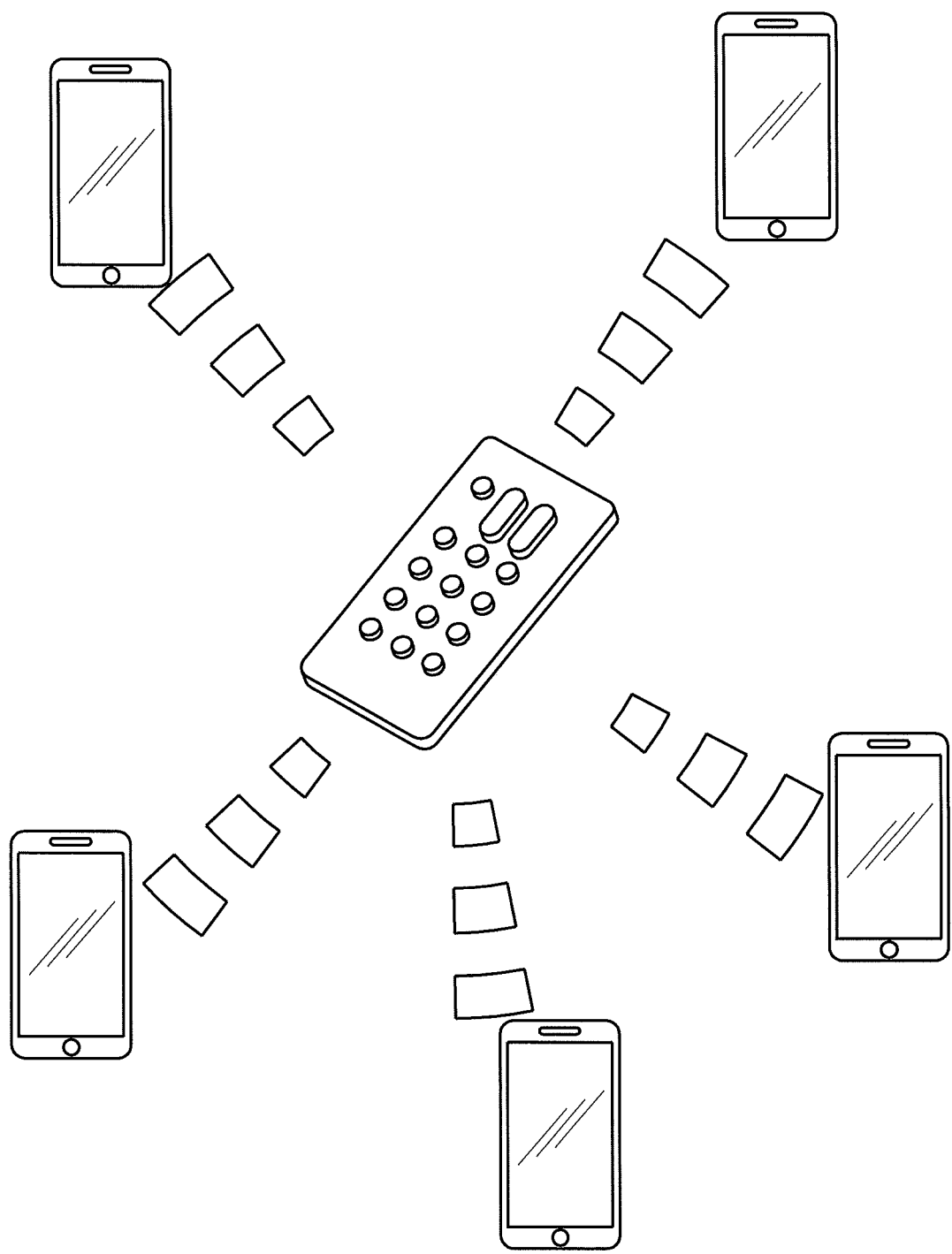
FIG. 22 illustrates an example embodiment synchronizing devices for use with aspects herein.

FIG. 22 illustrates an example embodiment synchronizing devices for use with aspects herein. A single controller can provide synchronizing signals or provision content simultaneously to a plurality of devices. In this manner, various devices or virtual reality systems (e.g., virtual reality headsets) can enter a travelable comprehensive immersion at the same time. Users can then co-attend a tour while maintaining some element of autonomy (e.g., view different things at tour stops) or the users can diverge immediately. In embodiments, user locations can be stored in memory to permit pausing or resuming of group activity and/or to aid in individual activity after group activity.

Figure 23:
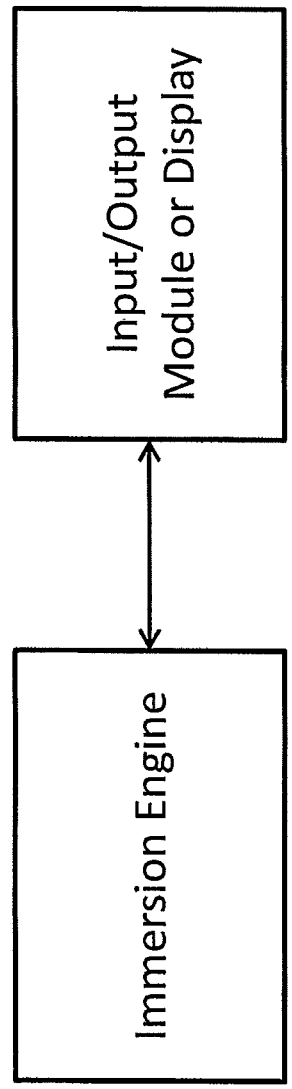
FIG. 23 illustrates an example embodiment of a system for viewing media.

FIG. 23 illustrates an example embodiment of a system for viewing media. In an embodiment, an immersion engine can be used to provide or render a travelable comprehensive immersion. The immersion engine may be the same as or a separate element from an immersive video generation module, and may communicate with various input/output modules, displays, or other intervening components.

FIGS. 24A to 24D illustrate an embodiment of a camera module using 8 (or another number) of lenses to create a virtual reality camera module. This camera improves flaws related to focal point and parallax resulting in blurry or doubled images (e.g., in close up shots or in small spaces). By using this disclosed camera module, focal point can be reduced to a minimum. This can be accomplished using small lenses (e.g., one inch or less, one half inch or less, one quarter inch or less) in some embodiments. A greater number of lenses can be used in various embodiments.

FIG. 24A illustrates an example embodiment of a camera (e.g., charge coupled device) which can be combined in such a module. The ribbon used to connect the device and its lens is shown extended to a longer distance in FIG. 24B. In embodiments, the ribbon length can be, e.g., 5 feet. The ribbon connector (which can be small in size in particular embodiments) is connected into position in the camera (or, e.g., phone, laptop or other device) carrying immersive imaging software. By disassembling the lenses from the cameras (or other devices) and having the lenses placed adjacently at close proximity (e.g., module carrying lenses less than 3 inches in diameter, less than 2 inches in diameter, et cetera), and having the other functions such as memory, batteries and others offset to save space between lenses, a virtual reality specific module avoiding some issues with focal length and parallax can be provided.

FIG. 24C shows how the above lens arrangement can be repeated (e.g., eight times for eight lenses) and placed into a mounting block (in this case, e.g., octahedron block) housing the lenses. The (e.g., eight) separate extended ribbons (or wires) can then be extended down a pole or chassis to interact with the device including storage and processing power. In alternative embodiments, no ribbons are required as compact wireless communication components are provided at each lens. Alternatively, the lenses can share a common wire or ribbon after being electrically coupled at the mounting block.

In an embodiment, a group of cables connected to individual cameras, mobile devices, et cetera can connect into a mobile computer or other computing device. The lenses can be arranged in, e.g., an octahedron. This is intended to minimize space between lenses and arranges the respective fields of view to avoid difficulties reconciling parallax. The distance between lenses and processing and/or storage equipment can be variable from zero to 30 feet or more. For example, with a drone carrying onboard computing elements, the distance between the lens arrangement and computing elements can be zero or minimal distance. For VR camera rigs, the distance can be 3 to 10 feet. And for remote security cameras, sporting event cameras, concerts, et cetera, the distance can be greater than 10 feet. These are only examples, and various other arrangements using wired or wireless components at distance.

In embodiments, computing elements disposed at a distance from a lens or lenses may be larger or more power-intensive than those which could be integrated into a mobile element, or such that close proximity to the camera lenses is impossible without obstructing the wide view(s). For example, a tiny lens or group of lenses can be provided in an enclosure courtside at a basketball game to capture the entire game without blocking spectator views of the game. The footprint to both other spectators (or viewing apparatuses) and the lens field of view is reduced by tethering (via wired or wireless means) is reduced by offsetting larger aspects. In this fashion, neither the visual data collected nor the image quality/processing need suffer on behalf of the other. Storage, processing, and power can be located distal to the lens or lenses to support high resolution, rapid stitching, and other processing to minimize camera system footprint.

FIG. 24D shows the above-disclosed camera module mounted atop a self-balancing immersive capture vehicle. The base of the self-balancing immersive capture vehicle can include one or more devices for each camera unit (or one device for multiple camera units) including memory and logic for recording synchronized and coordinated video producing immersive media. Various wired or wireless automatic, semi-automatic, and/or manual controls can be included between components of the system and/or users of the system. Batteries or other power means can also be provided.

In embodiments using small cameras with FIGS. 24A to 24D, focal points can be controlled to aid in combining different media sources into an immersive media product. By using a narrow, pole-like chassis and small base holding circuitry and other elements, the footprint of the device itself is quite small, and the device will not (or only minimally) interrupt clear views of the target space. In embodiments, image processing logic aboard the system or offsite can be used to remove the device itself from portions of the image which it interrupts.

Figure 25B:
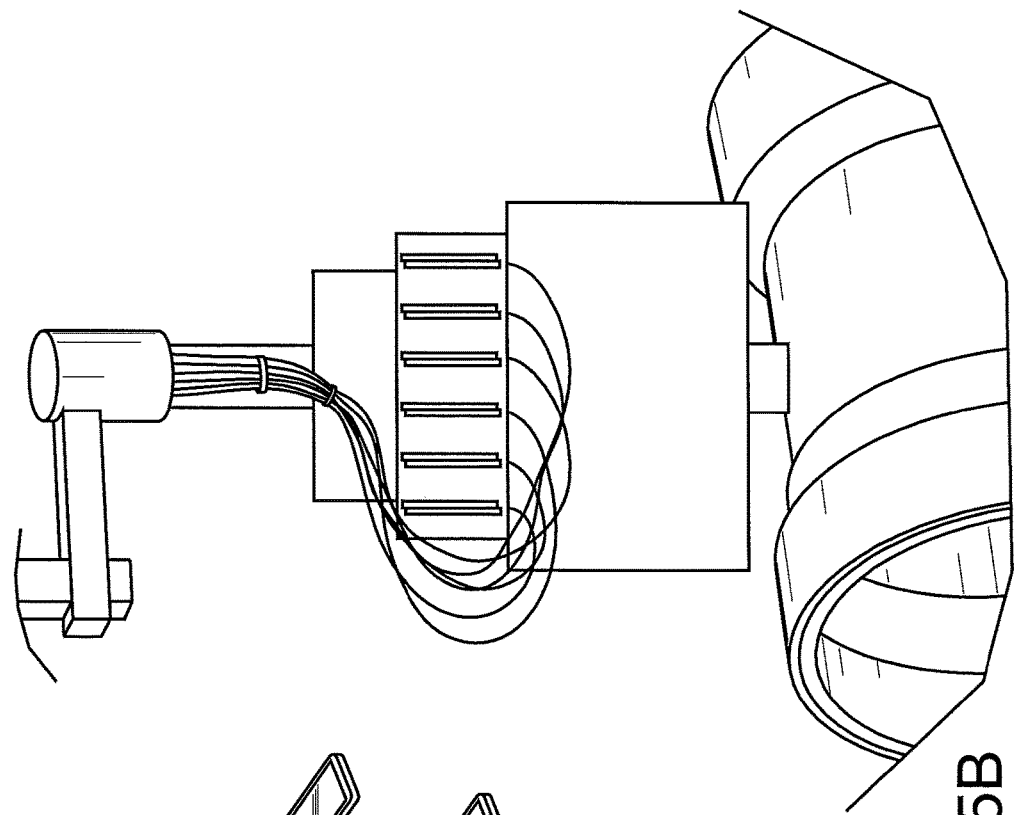
FIGS. 25A and 25B illustrate example embodiments of a camera module utilizing mobile devices.
Figure 25A:
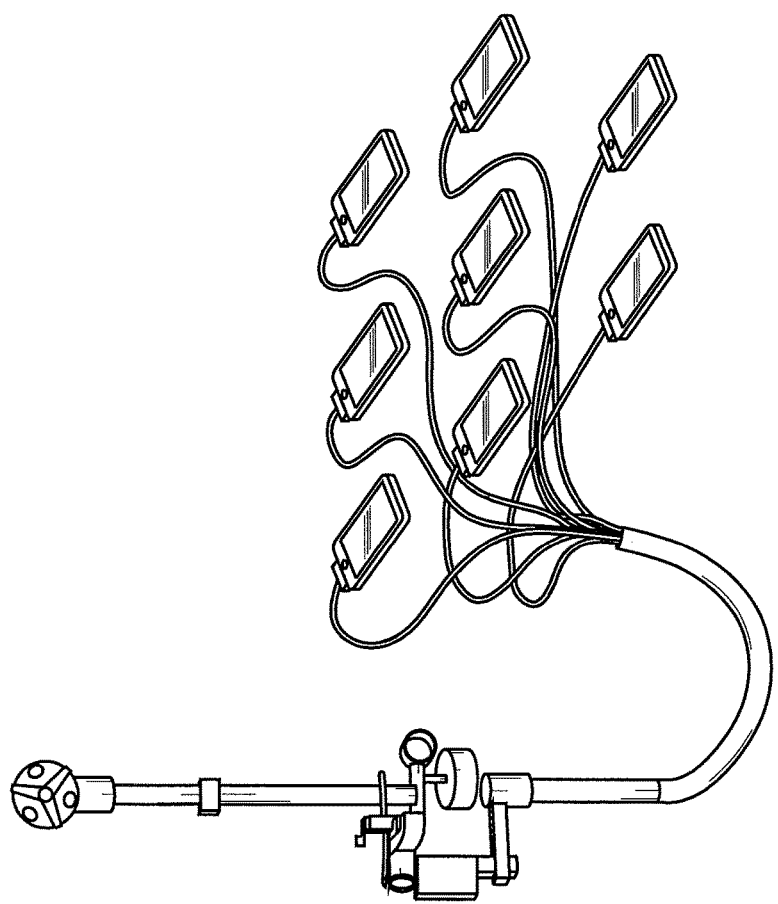

FIGS. 25A and 25B illustrate an embodiment where a plurality of phones, tablets, or other mobile devices are tethered to leverage image capture capabilities to produce a deconstructed camera such as that of FIGS. 24A to 24D. FIG. 25A shows a plurality of cell phone devices tethered using a wired configuration, while FIG. 25B shows each of the phones enclosed in a housing. The tethers can run to a camera mount on top of a camera rig.

The rig's chasses (through which wired tethers can be threaded) can be mounted atop a self-balancing vehicle as disclosed herein. The completed apparatus allows for rapid, steady, programmable, unmanned image capture, including high definition video, with little or no footprint or artifact left on the captured image data. The system can also include components and logic for post-production processing of video or audio, or provide captured image data to other systems for such. The self-balancing vehicle can be provided with gimbal stabilizers and self-guiding software to produce steady, zero-footprint shots (requiring no nadir). Due to the stability and high quality, removal of undesirable video imperfections such as ghosting and blurring is made simpler, less-intensive, and more accurate. Hardware and/or other components for such use can be provided in the vehicle or rig, or be accomplished remote thereto.

Figure 26:
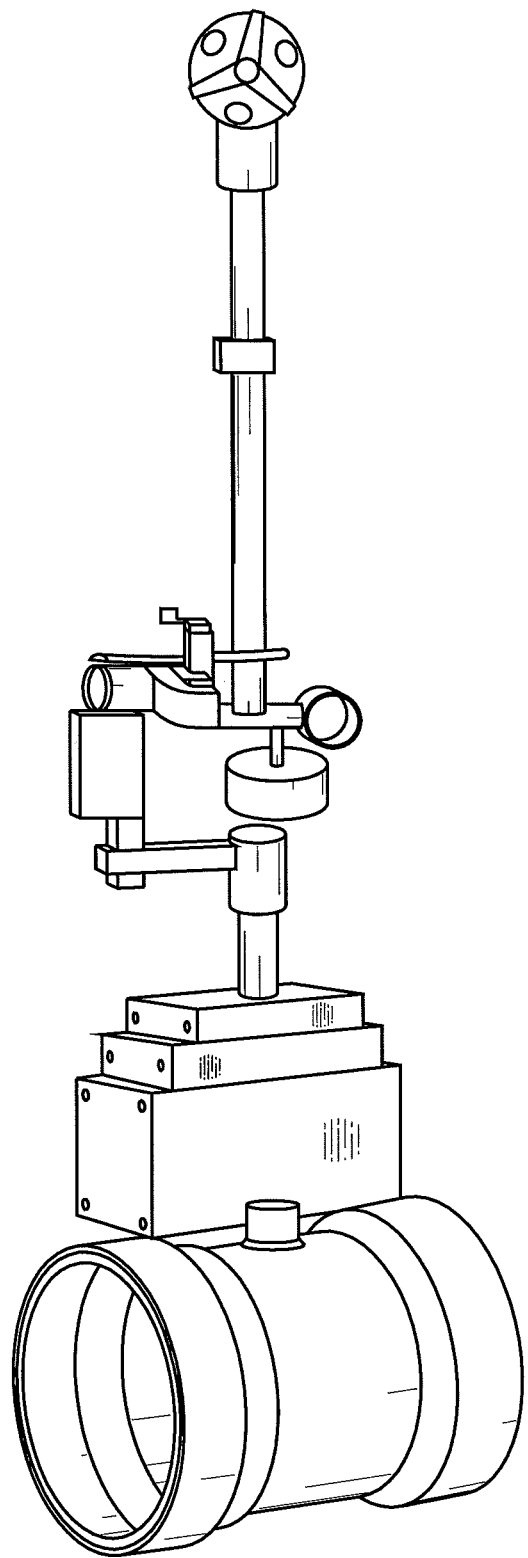
FIG. 26 illustrates an example embodiment of a system using a camera module.

FIG. 26 shows an application of systems described in earlier drawings, illustrating a self-balancing rig for image capture as disclosed herein.

Figure 27:
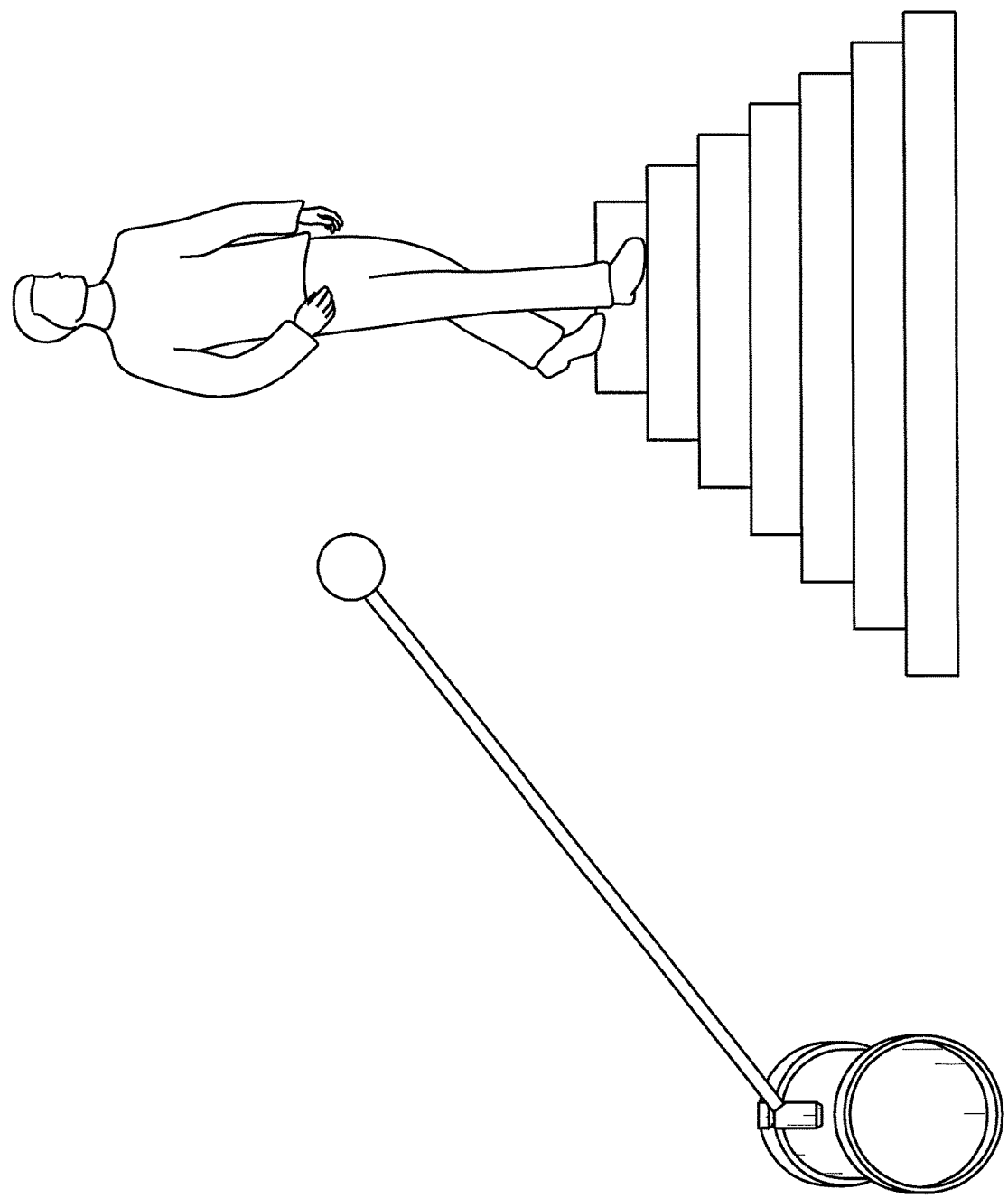
FIG. 27 illustrates an example embodiment of use of a system using a camera module.

FIG. 27 shows an application of systems described in, e.g., FIGS. 24A to 24D, FIG. 26, and others. In the embodiment of FIG. 27, the chassis is automatically extendable to provide smooth immersive video travelling up a staircase where the vehicle cannot traverse the staircase or where movement up the staircase would be too disruptive to the consistency and smoothness of the immersive video.

Figure 28A:
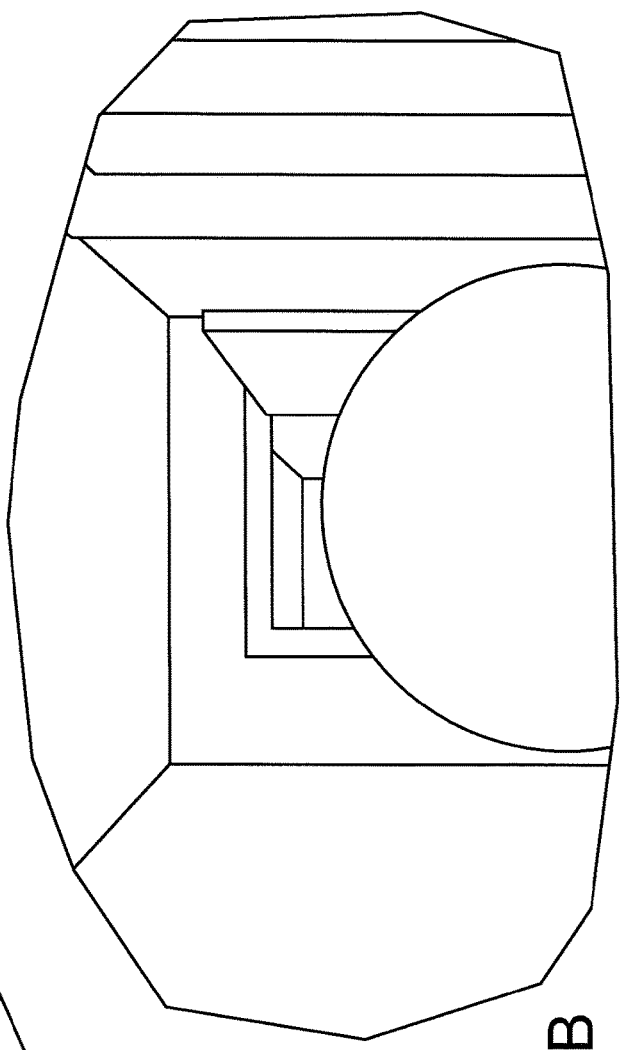
FIGS. 28A and 28B illustrate example aspects related to field of vision stop and go.
Figure 28B:
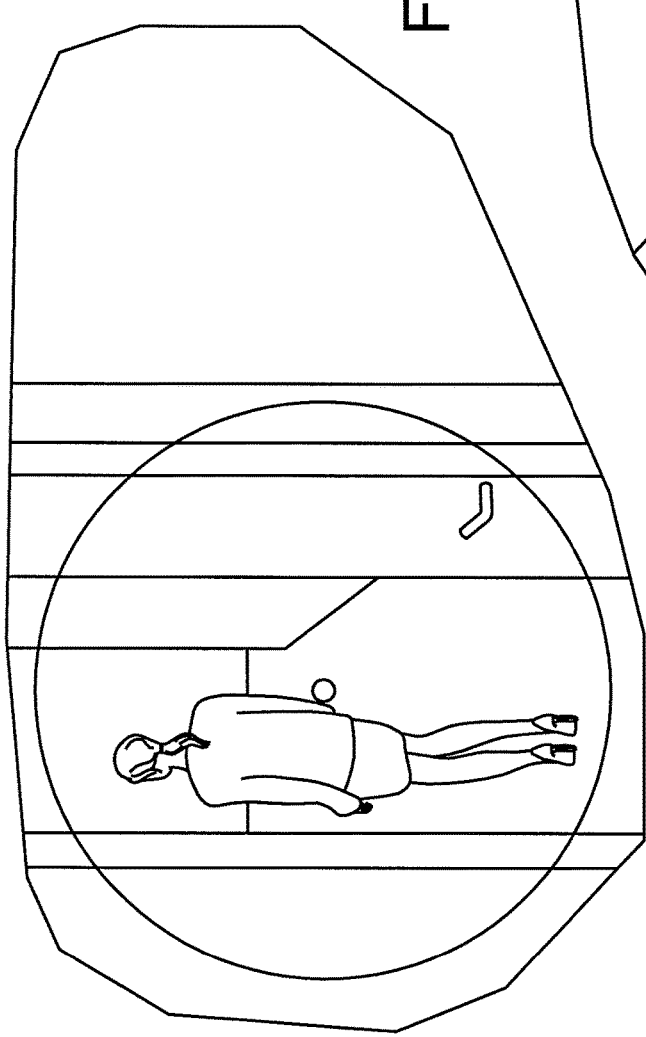

FIGS. 28A and 28B illustrates example aspects relating to field of vision control. Specifically, FIGS. 28A and 28B relate to examples employing field of vision stop and go (FVSG). A viewer "moves" through an immersion with a field of view during motion. However, FVSG control can be employed to modify motion when the field of view is changed. For example, when a user breaks his or her field of vision during user-guided or automated motion, motion in the immersion can be changed (e.g., stopped, slowed, limited to particular dimensions such as up-and-down movement but no lateral movement) to assist with viewing the particular site in the immersion during more detailed viewing. Thereafter, by returning the view to that for motion (which can, but need not be, the direction of motion), motion can resume. Alternatively, motion can be taken thereby snapping the view back to that for motion. FVSG can be toggle-able on and off, and may automatically engage or disengage based on various rules (e.g., enter a room during a tour where a virtual agent is speaking and look around room from stationary view in relation to virtual agent; FVSG returns the user view to a direction of travel or specific items of interest based on virtual agent activity). The agent can be instructed to avoid talking while walking so that any verbal communication is not met with a pause triggering FVSG activity.

Aspects herein can use high-definition or ultra-high-definition resolution cameras. Further technologies leveraged can include global positioning systems and other techniques. Location techniques can also employ cellular or network-based location, triangulation, radar, sonar, infrared or laser techniques, and image analysis or processing to discern distances and location information from images collected.

Aerial or waterborne drones (or similar devices) can be utilized in various embodiments as an immersive capture vehicle. In embodiments, two or more vehicles (which can be any combination of land-based, aerial, or marine) can be used simultaneously in a coordinated fashion to comprehensively capture a target space with greater speed or to capture views from locations and orientations which cannot be provided by a single device. Multiple devices can follow the same track in two dimensions at different heights, or different paths at the same or different heights. Multiple vehicles can be locationally "anchored" to one another (e.g., constrained in motion or position based on identification of one vehicle as a base unit, or constrained in motion or position based on a common movement plan) for alignment or offset to aid in coordination, and one or both may include independent navigation systems to aid in location control.

Combination of the various images can prevent the existence of blind spots in views created. A continuous, single and uncut scene of the target space is provided in both static and moving manners. Fluid travel in any direction of space up to the boundaries can be provided.

As noted above, features of interest or "hotpoints" can be emphasized in immersions by providing supplemental content, related audio content, particular views, or other aspects. Such aspects can be a window with a view, a vista or patio, a fireplace, a water feature, et cetera.

The environment of immersions can change, such as providing a 24-hour lighting cycle based on sun and/or weather.

The immersion permits users to control the interest, pace, and length of a tour or other remote viewing. The viewing can be sped up or slowed down at user desire.

Static cameras can be integrated with movable camera modules to provide additional views or reference views which can be used to aid in navigation or to provide specific visual information to users.

While aspects herein related to recording and providing immersions in embodiments concern track-less, free movement by the user, movable cameras or virtual viewing can travel along pre-programmed tracks in embodiments still using other aspects of the innovation.

In embodiments, an immersion can be edited to show the inclusion or exclusion of items and/or changes to the target space such as removal of a wall or other renovation. In such embodiments, the non-changed portions of the immersion remain recorded media of the actual space, while modelling can be leveraged to integrate changes to the actual space to realistically display the modifications of the target space. Where a target space includes partitions which are removed through editing (e.g., knock out a wall), actual collected media of both sides can be stitched with only the space occupied by the removed wall being a model or virtualization of the space. Augmented reality technology can be leveraged as well.

Controls can include user interfaces that allow jumping to different portions of an immersion, speed controls (e.g., fast forward and/or rewind based on movement or viewing orientation), mute button, drone view button (in relevant embodiments or where the drone view is distinguishable from the main immersive view), still capture button, time lapse (to pause environment or other activity and view freeze), view angle controls, location or position controls, view outside target space (e.g., view of building from outside or above), and so forth.

Features such as allowing virtual reality goggles to share power with a phone (e.g., either charging the other) can be provided.

The number of cameras can vary based on particular camera modules. Cost, field of view, resolution, lens size, and other considerations can be considered to customize a camera module or camera modules for a particular use.

Example services provided with aspects herein are solo target space (e.g., apartment, home, or commercial unit) tours, guided tours, three-dimensional and 360-degree floor-plans provided by augmented reality technology, websites or other network resources for hosting such (e.g., one per space or multiple spaces at a single hub), applications to aid in contracting, purchasing, payment, et cetera, related to immersions or supplemental content, and so forth.

In embodiments, immersive media can be used for training purposes. For example, individual cameras or camera modules located around a sports field can collect combinable media related to action on the sports field. In a specific example, the motion, delivery, speed, and movement of a pitch can be recorded from various angles, enabling an immersed batter to practice against a particular opponent pitcher.

Figure 29:
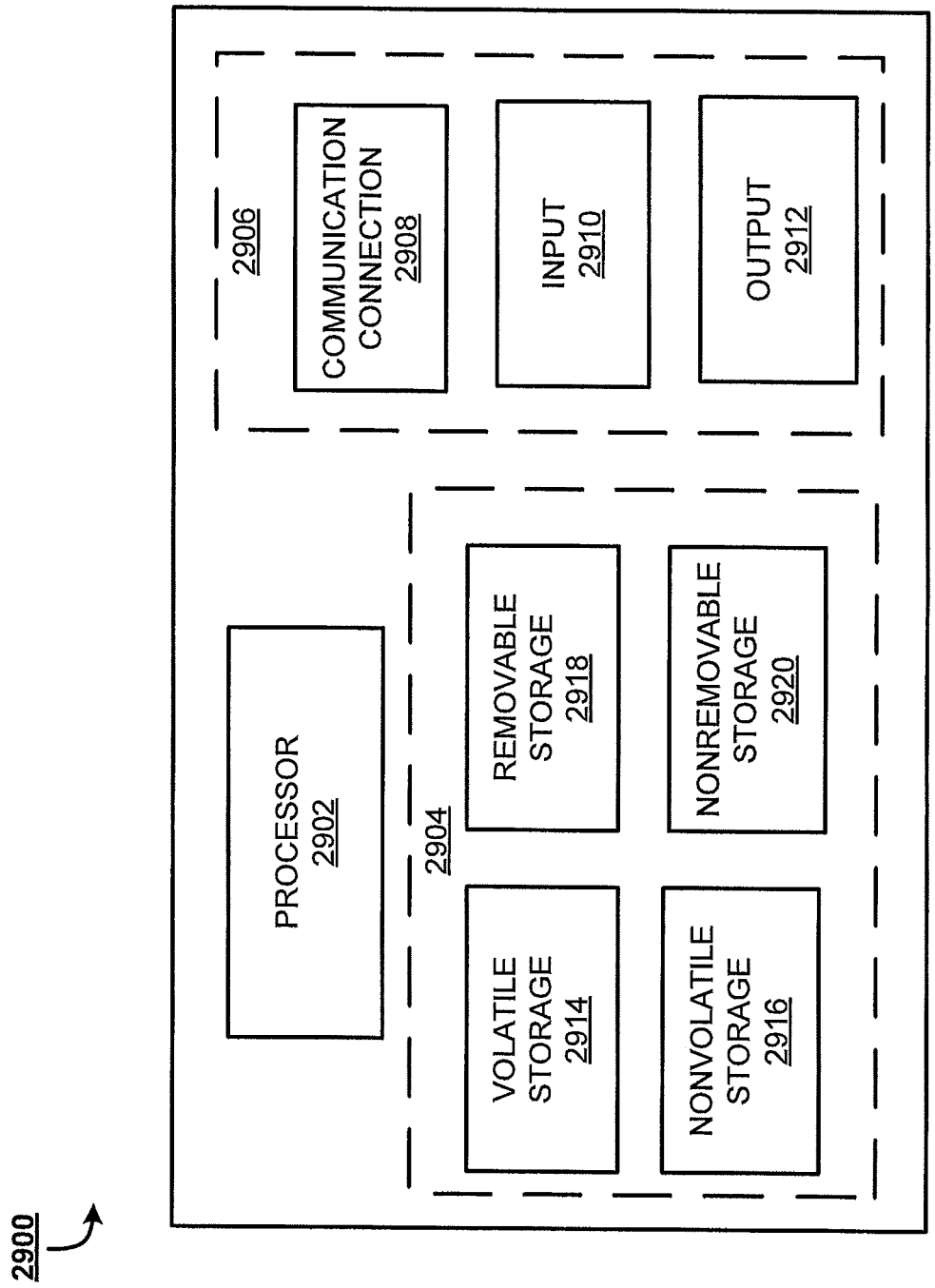
FIG. 29 illustrates an example computing environment used in conjunction with the disclosures herein.

Turning to FIG. 29, device 2900 may comprise all or a part of systems herein, aspects or components thereof, and/or facilitate methodologies disclosed herein. Device 2900 may comprise hardware or a combination of hardware and software. The functionality to facilitate telecommunications via a telecommunications network may reside in one or combination of more than one systems 100. Device 2900 depicted in FIG. 29 may represent or perform functionality of an appropriate device 2900, or combination of systems herein, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 29 is for purposes of example and not intended to imply a limitation to a specific implementation or configuration. Thus, device 2900 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Device 2900 may comprise a processor 2902 and a memory 2904 coupled to processor 2902. Memory 2904 may contain executable instructions that, when executed by processor 2902, cause processor 2902 to effectuate operations associated with aspects herein. As evident from the description herein, device 2900 is not to be construed as software per se.

In addition to processor 2902 and memory 2904, device 2900 may include an input/output system 2906. Processor 2902, memory 2904, and input/output system 2906 may be coupled together (coupling not shown in FIG. 29) to allow communications therebetween. Each portion of device 2900 may comprise circuitry for performing functions associated with each respective portion. Thus, each portion may comprise hardware, or a combination of hardware and software. Accordingly, each portion of device 2900 is not to be construed as software per se. Input/output system 2906 may be capable of receiving or providing information from or to a communications device or other network entities configured for telecommunications. For example input/output system 2906 may include a wireless communications (e.g., WiFi/2.5G/3G/4G/GPS) card. Input/output system 2906 may be capable of receiving or sending video information, audio information, control information, image information, data, or any combination thereof. Input/output system 2906 may be capable of transferring information with device 2900. In various configurations, input/output system 2906 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 2906 may comprise a WiFi finder, a two-way GPS chipset or equivalent, or the like, or a combination thereof.

Input/output system 2906 of device 2900 also may contain communication connection 2908 that allows device 2900 to communicate with other devices, network entities, or the like. Communication connection 2908 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 2906 also may include an input device 2910 such as keyboard, mouse, pen, voice input device, or touch input device. Input/output system 2906 may also include an output device 2912, such as a display, speakers, or a printer.

Processor 2902 may be capable of performing functions associated with telecommunications, such as functions for processing broadcast messages. For example, processor 2902 may be capable of, in conjunction with any other portion of device 2900, determining a type of broadcast message and acting according to the broadcast message type or content.

Memory 2904 of device 2900 may comprise a storage medium having a concrete, tangible, physical structure. As is known, a signal does not have a concrete, tangible, physical structure. Memory 2904, as well as any computer-readable storage medium, is not to be construed as a signal. Memory 2904, as well as any computer-readable storage medium, is not to be construed as a transient signal. Memory 2904, as well as any computer-readable storage medium, is not to be construed as a propagating signal. Memory 2904, as well as any computer-readable storage medium, is to be construed as an article of manufacture.

Memory 2904 may store any information utilized in conjunction with telecommunications. Depending upon the exact configuration or type of processor, memory 2904 may include a volatile storage 2914 (such as some types of RAM), a nonvolatile storage 2916 (such as ROM, flash memory), or a combination thereof. Memory 2904 may include additional storage (e.g., a removable storage 2918 or a nonremovable storage 2920) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 2900. Memory 2904 may comprise executable instructions that, when executed by processor 2902, cause processor 2902 to effectuate operations to perform at least a portion of aspects disclosed herein.

In embodiments, device 2900 includes one or more cameras, or is integrated into one or more cameras. In embodiments, device 2900 includes one or more sensors discussed herein, or is integrated into one or more sensors discussed herein.

Figure 30:
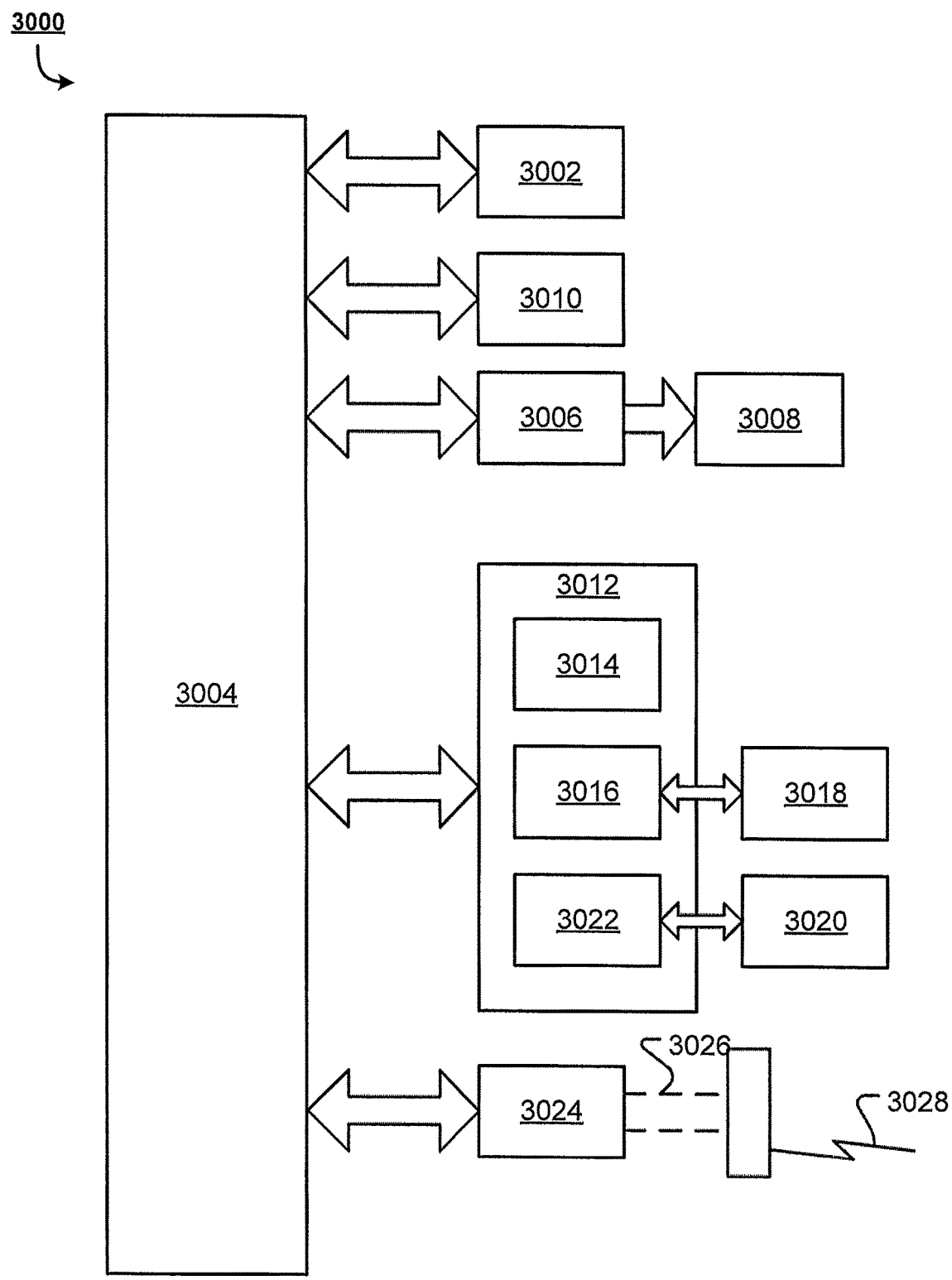
FIG. 30 illustrates an example network environment used in conjunction with the disclosures herein.

FIG. 30 illustrates a computer-based system 3000 that may constitute or include parts of one or more of systems or facilitate methods disclosed herein. Computer-based system 3000 includes at least one processor, such as a processor 3002. Processor 3002 may be connected to a communication infrastructure 3004, for example, a communications bus, a cross-over bar, a network, or the like. Various software aspects are described in terms of this example computer-based system 3000. Upon perusal of the present description, it will become apparent to a person skilled in the relevant art(s) how to implement the present disclosure using other computer systems or architectures.

Computer-based system 3000 includes a display interface 3006 that forwards graphics, text, or other data from communication infrastructure 3004 or from a frame buffer (not shown) for display on a display unit 3008.

Computer-based system 3000 further includes a main memory 3010, such as random access memory (RAM), and may also include a secondary memory 3012. Secondary memory 3012 may further include, for example, a hard disk drive 3014 or a removable storage drive 3016, representing a floppy disk drive, a magnetic tape drive, an optical disk drive, et cetera. Removable storage drive 3016 reads from or writes to a removable storage unit 3018 in a well-known manner. Removable storage unit 3018 may represent a floppy disk, magnetic tape, or an optical disk, and may be read by and written to by removable storage drive 3016. As will be appreciated, removable storage unit 3018 includes a computer usable storage medium having computer software or data stored therein.

In accordance with various aspects of the present disclosure, secondary memory 3012 may include other similar devices for allowing computer programs or other instructions to be loaded into computer-based system 3000. Such devices may include, for example, a removable storage unit 3020 and an interface 3022. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 3020 to computer-based system 3000.

Computer-based system 3000 may further include communication interface 3024. Communication interface 3024 may allow software or data to be transferred between computer-based system 3000 and external devices. Examples of communication interface 3024 include, but may not be limited to a modem, a network interface (such as an Ethernet card), a communications port, a Personal Computer Memory Card International Association (PCMCIA) slot and card, or the like. Software or data transferred via communication interface 3024 may be in the form of a number of signals, hereinafter referred to as signals 3026, which may be electronic, electromagnetic, optical or other signals capable of being received by communication interface 3024. Signals 3026 may be provided to communication interface 3024 via a communication path (e.g., channel) 3028. Communication path 3028 carries signals 3026 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 3016, a hard disk installed in hard disk drive 3014, or the like. These computer program products provide software to computer-based system 3000. The present disclosure is directed to such computer program products.

Computer programs (also referred to as computer control logic) may be stored in main memory 3010 or secondary memory 3012. The computer programs may also be received via communication interface 3004. Such computer programs, when executed, enable computer-based system 3000 to perform the functions consistent with the present disclosure, as discussed herein. In particular, the computer programs, when executed, enable processor 3002 to perform the features of the present disclosure. Accordingly, such computer programs represent controllers of computer-based system 3000.

In accordance with an aspect of the present disclosure, where the disclosure is implemented using a software, the software may be stored in a computer program product and loaded into computer-based system 3000 using removable storage drive 3016, hard disk drive 3014, or communication interface 3024. The control logic (software), when executed by processor 3002, causes processor 3002 to perform the functions of the present disclosure as disclosed herein.

In another aspect, the present disclosure is implemented primarily in hardware using, for example, hardware components, such as application specific integrated circuits (ASIC). Implementation of the hardware state machine to perform the functions disclosed herein will be apparent to persons skilled in the relevant art(s). In yet another aspect, the present disclosure is implemented using a combination of both the hardware and the software. In another aspect, the present disclosure is implemented using software.

This written description uses examples to disclose the invention, including the best mode, and also to enable one of ordinary skill in the art to practice the invention, including making and using devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A system, comprising:
    an immersive camera module including a camera mounting block having a plurality of camera mounting sites and a plurality of cameras mounted to the plurality of camera mounting sites, the immersive camera module configured to capture a target space at discrete locations of the target space spaced apart from one another by distance intervals predetermined by a desired capture rate based on a target resolution;
    an immersive video generation module configured to seamlessly combine the capture of the target space to a travelable comprehensive immersion, wherein seamlessly combining the capture of the target space includes continuously stitching at least one image from each of the plurality of cameras at a first one of the discrete locations of the target space to produce a first location immersion, continuously stitching at least one image from each of the plurality of cameras at a second one of the discrete locations of the target space to produce a second location immersion, and continuously stitching the first location immersion and the second location immersion to create a travelable comprehensive immersion including a synthesized view of the target space from a location at which none of the plurality of cameras are present, the travelable comprehensive immersion further including one or more virtual items superimposed into the target space and supplemental content providing information relating to the one or more virtual items superimposed into the target space; and
    a chassis operatively coupled with the immersive camera module, the chassis configured to smoothly maneuver the immersive camera module through the target space between the discrete locations of the target space.

2. The system of claim 1, further comprising:
    an immersive capture vehicle; and
    an immersive capture vehicle controller configured to control movement of the immersive capture vehicle,
    wherein the chassis is operatively coupled to the immersive capture vehicle, and wherein the immersive capture vehicle is configured to smoothly maneuver the chassis and the immersive camera module through the target space between the discrete locations of the target space.

3. The system of claim 2, further comprising:
    a sensor module which collects space geometry and obstacle data related to the target space.

4. The system of claim 3, the immersive capture vehicle is configured to maneuver about obstacles based on the space geometry and the obstacle data.

5. The system of claim 3, further comprising:
    a modeling module configured to generate a model of the target space based on the space geometry and the obstacle data; and
    a path module configured to generate path instructions for the immersive capture vehicle controller, wherein the path instructions avoid obstacles and facilitate capturing the target space based on the model.

6. The system of claim 1, further comprising a physical interface operatively coupled to the chassis, wherein the physical interface is configured to facilitate smooth maneuver of the chassis and the immersive camera module through the target space.

7. The system of claim 1, further comprising an adjustment module of the chassis.

8. The system of claim 1, further comprising at least one of:
a shock-absorbing module of the chassis configured to stabilize the immersive camera module; and
a pivot-plumb component of the chassis configured to stabilize the immersive camera module.

9. The system of claim 1, wherein:
the plurality of cameras are mounted to the immersive camera module such that the immersive camera module is configured to capture a 360-degree panoramic view of the target space; and
wherein at least one of the plurality of cameras is mounted atop the immersive camera module to capture an upward view of the target space.

10. The system of claim 1, wherein the travelable comprehensive immersion includes local noise from the target space.

11. The system of claim 1, wherein the supplemental content is selected from the group consisting of an additional view of the one or more items, information for purchasing the one or more items, a link to the one or more items, and a feature of interest with respect to the one or more items.

12. A method, comprising:
providing an immersive camera module including a camera mounting block having a plurality of camera mounting sites and a plurality of cameras mounted to the plurality of camera mounting sites, the immersive camera module configured to capture a target space at discrete locations of the target space spaced apart from one another by distance intervals predetermined by a desired capture rate based on a target resolution;
providing a chassis operatively coupled with the immersive camera module, the chassis configured to smoothly maneuver the immersive camera module through the target space;
recording a first image from a first one of the plurality of cameras at a first one of the discrete locations of the target space;
recording a second image from a second one of the plurality of cameras at a second one of the discrete locations of the target space offset from the first one of the discrete locations of the target space; and
simultaneously while recording, smoothly maneuvering the immersive camera module through the target space between the discrete locations of the target space; and
continuously stitching the first and the second images to create a travelable comprehensive immersion configured to seamlessly combine the capture of the target space at the discrete locations of the target space, the travelable comprehensive immersion including a synthesized view of a third location of the target space different from each of the first and second ones of the discrete locations of the target space, wherein neither the first one nor the second one of the plurality of cameras are present at the third location of the target space or configured to record images at the third location of the target space.

13. The method of claim 12, further comprising:
providing a vehicle; and
providing a vehicle controller,
wherein the chassis is mounted to the vehicle, and wherein the vehicle is configured to smoothly maneuver the chassis through the target space between the discrete locations of the target space.

14. The method of claim 12, further comprising generating a path through the target space prior to recording and maneuvering.

15. The method of claim 14, further comprising determining one or more maneuver paths through the target space.

16. The method of claim 14, further comprising:
providing a sensor module configured to collect space geometry and obstacle data within the target space; and
generating a model of the target space based on the space geometry and the obstacle data, wherein the path is based on the model.

17. The method of claim 12, further comprising:
outputting the travelable comprehensive immersion including the synthesized view of the third location to a client device; and
navigating the travelable comprehensive immersion on the client device.

* * * * *